(12) United States Patent
Rossi

(10) Patent No.: US 11,340,604 B2
(45) Date of Patent: May 24, 2022

(54) DETECTING AND CORRECTING FOR DISCREPANCY EVENTS IN FLUID PIPELINES

(71) Applicant: Schlumberger Technology Corporation, Sugar Land, TX (US)

(72) Inventor: David Rossi, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 86 days.

(21) Appl. No.: 16/606,216

(22) PCT Filed: Apr. 20, 2018

(86) PCT No.: PCT/US2018/028457
§ 371 (c)(1),
(2) Date: Oct. 17, 2019

(87) PCT Pub. No.: WO2018/195368
PCT Pub. Date: Oct. 25, 2018

(65) Prior Publication Data
US 2020/0133251 A1 Apr. 30, 2020

Related U.S. Application Data

(60) Provisional application No. 62/487,987, filed on Apr. 20, 2017.

(51) Int. Cl.
*G05B 23/02* (2006.01)
*F17D 5/06* (2006.01)
*G01F 1/74* (2006.01)
(Continued)

(52) U.S. Cl.
CPC .......... *G05B 23/0254* (2013.01); *F17D 5/06* (2013.01); *G01M 3/2815* (2013.01);
(Continued)

(58) Field of Classification Search
None
See application file for complete search history.

(56) References Cited

U.S. PATENT DOCUMENTS

| 7,725,301 B2 * | 5/2010 | Shah | E21B 47/10 703/10 |
|---|---|---|---|
| 2008/0082215 A1 | 4/2008 | McDowell | |
| 2015/0300907 A1 | 10/2015 | Giunta et al. | |
| 2016/0356125 A1 * | 12/2016 | Bello | G06Q 10/067 |

(Continued)

FOREIGN PATENT DOCUMENTS

| WO | 2015/153130 A1 | 10/2015 |
|---|---|---|
| WO | 2016/154160 A1 | 9/2016 |

OTHER PUBLICATIONS

Modisette, "Automatic Tuning of Pipeline Models" PSIG Annual Meeting 2004 (Year: 2004).*

(Continued)

*Primary Examiner* — John C Kuan

(57) ABSTRACT

Techniques for detecting and correcting for discrepancy events in a fluid pipeline are presented. The techniques can include obtaining a plurality of empirical temperature and pressure measurements at a plurality of locations within the pipeline; simulating, using a pipeline model, a plurality of simulated temperature and pressure measurements for the plurality of locations within the pipeline; detecting, by a discrepancy event detector, at least one discrepancy event representing a discrepancy between the empirical temperature and pressure measurements and the simulated temperature and pressure measurements; outputting to a user an indication that the at least one discrepancy event has been detected; accounting for the at least one discrepancy; determining, after the accounting and using an estimator applied (Continued)

to the pipeline model, a corrected branch flow rate for the pipeline; and outputting the corrected branch flow rate for the pipeline to the user.

19 Claims, 24 Drawing Sheets

(51) Int. Cl.
    *G01F 1/86*     (2006.01)
    *G01M 3/28*     (2006.01)

(52) U.S. Cl.
    CPC .............. G05B 23/024 (2013.01); *G01F 1/74* (2013.01); *G01F 1/86* (2013.01)

(56) References Cited

U.S. PATENT DOCUMENTS

2017/0076563 A1     3/2017   Guerriero et al.
2017/0191862 A1*   7/2017   Gonzaga ............. G01F 25/0007

OTHER PUBLICATIONS

James, et al., "Intelligent Fields Management at Woodside: A Low-Cost Step Improvement in Field Management Using Off the Shelf Technology," SPE 116519, 2008 SPE Asia Pacific Oil & Gas Conference and Exhibition held in Perth, Australia Oct. 20-22, 2008.

International Search Report and Written Opinion for the equivalent International patent application PCT/US2018/028457 dated Aug. 10, 2018.

International Preliminary Report on Patentability for the counterpart International patent application PCT/US2018/028457 dated Oct. 31, 2019.

First Examination Report dated Jul. 5, 2021 for the equivalent GB Application 1915260.2 (3 pages).

Mendel, Lessons in Digital Estimation Theory, "Lesson 12, Elements of Multivariate Gaussian Random Variables," Prentice-Hall, Inc., 1987, ISBN 0-13-530809-7, pp. 100-107.

* cited by examiner

| | | | | A:42 Q:37 | Schlumberger |
|---|---|---|---|---|---|
| 001 | 🖉 | 24.04.2016 14:50:39" | XP-121 VFM FRIEND Service Request (calibration required) | | |
| 002 | 🖉 | 24.04.2016 14:50:39" | PTEC_1 Common Console - Communication Fault for XP-121 | | |
| 003 | 🖉 | 24.04.2016 14:50:39" | PTEC_1 Common Console - Communication Fault for XP-122 | | |
| 004 | 🖉 | 24.04.2016 14:50:39" | PTEC_1 Common Console - Communication Fault for XP-123 | | |
| 005 | 🖉 | 24.04.2016 14:50:39" | PTEC_1 Common Console - Communication Fault for XP-124 | | |
| 006 | 🖉 | 24.04.2016 14:50:39" | PTEC_1 Common Console - Communication Fault for XP-125 | | |
| 007 | 🖉 | 24.04.2016 14:50:39" | PTEC_1 Common Console - Communication Fault for XP-126 | | |
| 008 | 🖉 | 24.04.2016 14:50:39" | HPU Communication Fault HPUA | | |
| | | Production-Tree-XP-121 | SCM Hydraulics | SCM Diagnostics | Cam01A MCS Version: 0.01 |

DETECTING AND CORRECTING FOR DISCREPANCY EVENTS IN FLUID PIPELINES

RELATED APPLICATION

The present application claims priority to, and the benefit of, U.S. Provisional Patent Application No. 62/487,987 entitled "Statistical Detection and Estimation for Virtual Flow Metering" to Rossi, filed Apr. 20, 2017, the contents of which are hereby incorporated by reference in their entirety.

BACKGROUND

In the oil and gas industry, mathematical models for an oil-gas production system (e.g., reservoirs, wells, surface flow line networks and equipment, and production plant facilities) are used to understand the current state and future behavior of the production system. For example, a model for a single branch production system may include a subsurface vertical well completion (e.g., reservoir fluid entry into the perforations of a vertical well), a well tubing extending from bottom hole to the tubing head at surface, a surface choke used to regulate the flow rate, and a surface flow line extending from the choke to facility equipment (e.g., a fluid separator). For such a case, the thermal-hydraulic behavior such as the distribution of pressure, temperature, and multiphase fluid flow rates along the production path can be modeled using any of several software applications that represent either the steady-state system behavior (that is, during normal continuous operation) or the transient dynamic behavior (that is, during transient events, such as start-up).

SUMMARY OF EMBODIMENTS

According to various embodiments, a method of detecting and correcting for discrepancy events in a fluid pipeline is presented. The method includes obtaining a plurality of empirical temperature and pressure measurements at a plurality of locations within the pipeline; simulating, using a pipeline model, a plurality of simulated temperature and pressure measurements for the plurality of locations within the pipeline; detecting, by a discrepancy event detector, at least one discrepancy event representing a discrepancy between the empirical temperature and pressure measurements and the simulated temperature and pressure measurements; outputting to a user an indication that the at least one discrepancy event has been detected; accounting for the at least one discrepancy; determining, after the accounting and using an estimator applied to the pipeline model, a corrected branch flow rate for the pipeline; and outputting the corrected branch flow rate for the pipeline to the user. Various optional features of the above embodiments include the following. The pipeline model may include a pipeline simulation model that models transient events in the pipeline. The accounting for the at least one discrepancy may include accounting for the at least one discrepancy by modifying at least one value of the empirical pressure and temperature measurements. The discrepancy event may include at least one of: a change in fluid phase fraction, erosion of a choke in the pipeline, deposition of solids in the pipeline, or the presence of measurement bias in a sensor for the pipeline. The discrepancy event detector may include a filter bank. The filter bank may perform a plurality of simultaneous likelihood computations. The estimator may include a linear Bayesian minimum mean square error estimator. The linear Bayesian minimum mean square error estimator may combine uncertainties of inputs to, and outputs of, the pipeline model to estimate values of inputs to, and outputs of, the pipeline model. The corrected branch flow rate may include a flow rate for at least one of: petroleum, water, and gas. The corrected branch flow rate may include a multiphase fluid flow rate.

According to various embodiments, a system for detecting and correcting for discrepancy events in a fluid pipeline is presented. The system includes at least one electronic processor that executes persistently stored instructions to perform operations including: obtaining a plurality of empirical temperature and pressure measurements at a plurality of locations within the pipeline; simulating, using a pipeline model, a plurality of simulated temperature and pressure measurements for the plurality of locations within the pipeline; detecting, by a discrepancy event detector, at least one discrepancy event representing a discrepancy between the empirical temperature and pressure measurements and the simulated temperature and pressure measurements; outputting to a user an indication that the at least one discrepancy event has been detected; accounting for the at least one discrepancy; determining, after the accounting and using an estimator applied to the pipeline model, a corrected branch flow rate for the pipeline; and outputting the corrected branch flow rate for the pipeline to the user.

Various optional features of the above embodiments include the following. The pipeline model may include a pipeline simulation model that models transient events in the pipeline. The accounting for the at least one discrepancy may include accounting for the at least one discrepancy by modifying at least one value of the empirical pressure and temperature measurements. The discrepancy event may include at least one of: a change in fluid phase fraction, erosion of a choke in the pipeline, deposition of solids in the pipeline, or the presence of measurement bias in a sensor for the pipeline. The discrepancy event detector may include a filter bank. The filter bank may perform a plurality of simultaneous likelihood computations. The estimator may include a linear Bayesian minimum mean square error estimator. The linear Bayesian minimum mean square error estimator may combine uncertainties of inputs to, and outputs of, the pipeline model to estimate values of inputs to, and outputs of, the pipeline model. The corrected branch flow rate may include a flow rate for at least one of: petroleum, water, and gas. The corrected branch flow rate may include a multiphase fluid flow rate.

Some embodiments have pronounced advantages over the prior art. Some embodiments account for physical breakdown of pipeline hardware (e.g., choke erosion, sensor bias, etc.) by correcting flow estimates. (The term "pipeline" is used herein to refer to both surface and subsurface piping and tubulars.) Some embodiments detect the physical breakdown of pipeline hardware and automatically correct for it. Some embodiments perform these functions for either of steady-state or transient pipeline models. Because there is no reason to expect consistent measurements throughout the pipeline in transient pipeline models, prior art techniques for estimating pipeline flow while accounting for physical breakdown of pipeline hardware cannot be applied to such models. These and other advantages are disclosed herein.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 28 and 29 are a screenshot of a control console according to some embodiments.

FIG. 30 illustrates a schematic view of a computing system, according to some embodiments.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

I. Introduction and Description of the Problem

Figure 1:
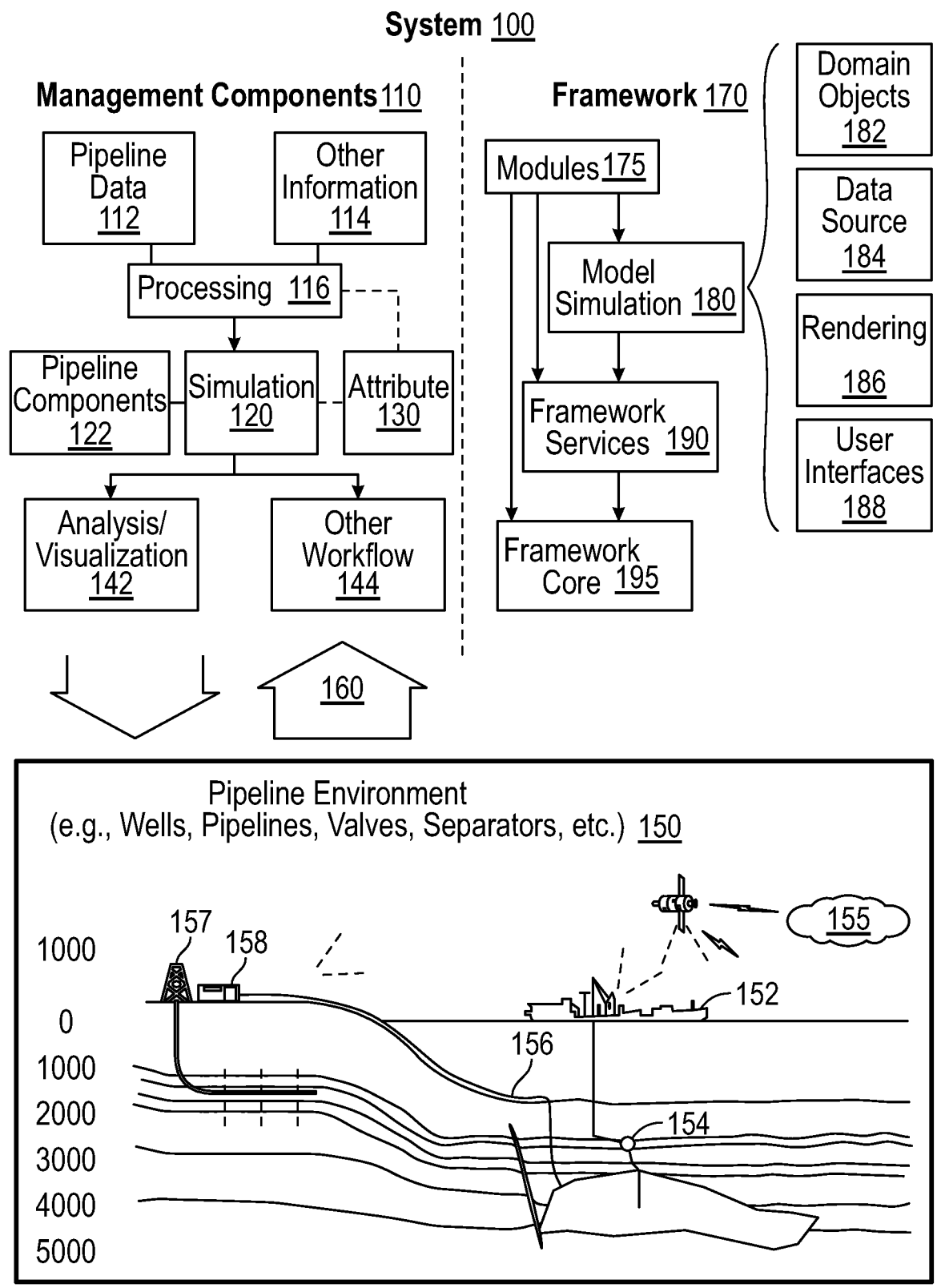
FIG. 1 illustrates an example of a system that includes various management components to manage various aspects of a pipeline environment, according to some embodiments.

FIG. 1 illustrates an example of a system 100 that includes various management components 110 to manage various aspects of a pipeline environment 150 (e.g., an environment that includes wells, transportation lines, risers, chokes, valves, separators, etc.). (As noted earlier, the term "pipeline" is used herein to refer to both surface and subsurface piping and tubulars.) For example, the management components 110 may allow for direct or indirect management of design, operations, control, optimization, etc., with respect to the pipeline environment 150. In turn, further information about the pipeline environment 150 may become available as feedback 160 (e.g., optionally as input to one or more of the management components 110). Management components 110 may be implemented using hardware as shown and described below in reference to FIG. 30.

In the example of FIG. 1, the management components 110 include a pipeline configuration component 112, an additional information component 114 (e.g., fluid measurement data), a processing component 116, a simulation component 120, an attribute component 130, an analysis/visualization component 142 and a workflow component 144. In operation, pipeline configuration data and other information provided per pipeline configuration component 112 and 114 may be input to the simulation component 120.

In an example embodiment, the simulation component 120 may rely on pipeline components 122. The pipeline components 122 may include pipe structures and/or equipment. In the system 100, the components 122 can include virtual representations of actual physical components that are reconstructed for purposes of simulation. The components 122 may include components based on data acquired via sensing, observation, etc. (e.g., the pipeline configuration 112 and other information 114). Pipeline components 122 may be characterized by one or more properties (e.g., a pipeline model may be characterized by changes in pressure, heat transfer, pipe inclination and geometry, etc.). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the pipeline environment 150, which may be relied on to simulate behavior of the pipeline environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as a simulator provided in OLGA® (Schlumberger Limited, Houston Tex. Further, in an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, pipeline engineers, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially-available OCEAN® framework where the model simulation layer 180 is the commercially-available PETREL® model-centric software package that hosts OCEAN® framework applications. In an example embodiment, the PETREL® software may be considered a data-driven application. The PETREL® software can include a framework for model building and visualization. Framework 170 may be implemented using hardware as shown and described below in reference to FIG. 30, for example.

As an example, a framework may include features for implementing one or more mesh generation techniques. For example, a framework may include an input component for receipt of information from interpretation of pipeline configuration, one or more attributes based at least in part on pipeline configuration, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the pipeline environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or include circuitry for imagery (e.g., spatial, spectral, temporal, radiometric, etc.).

FIG. 1 also shows the pipeline environment 150 as optionally including equipment 157 and 158 associated with a well. As an example, the equipment 157 and/or 158 may include components, a system, systems, etc. for pipeline condition monitoring, sensing, valve modulation, pump control, analysis of pipeline data, assessment of one or more pipelines 156, etc. The pipelines 156 may include at least a portion of the well, and may form part of, or be representative of, a network of pipes which may transport a production fluid (e.g., hydrocarbon) from one location to another.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on pipeline configuration, seismic attribute(s), etc. As an example, a workflow may be a process implementable in the OCEAN® framework. As an example, a workflow may include one or more worksteps that access a module such as a plug-in (e.g., external executable code, etc.).

Figure 2:
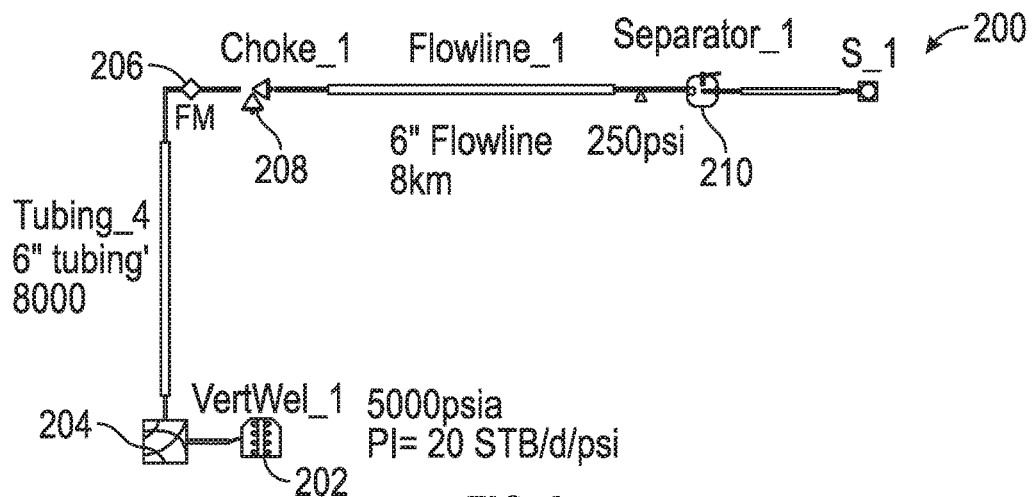
FIG. 2 illustrates a schematic view of a single branch production system, according to some embodiments.
Figure 3:
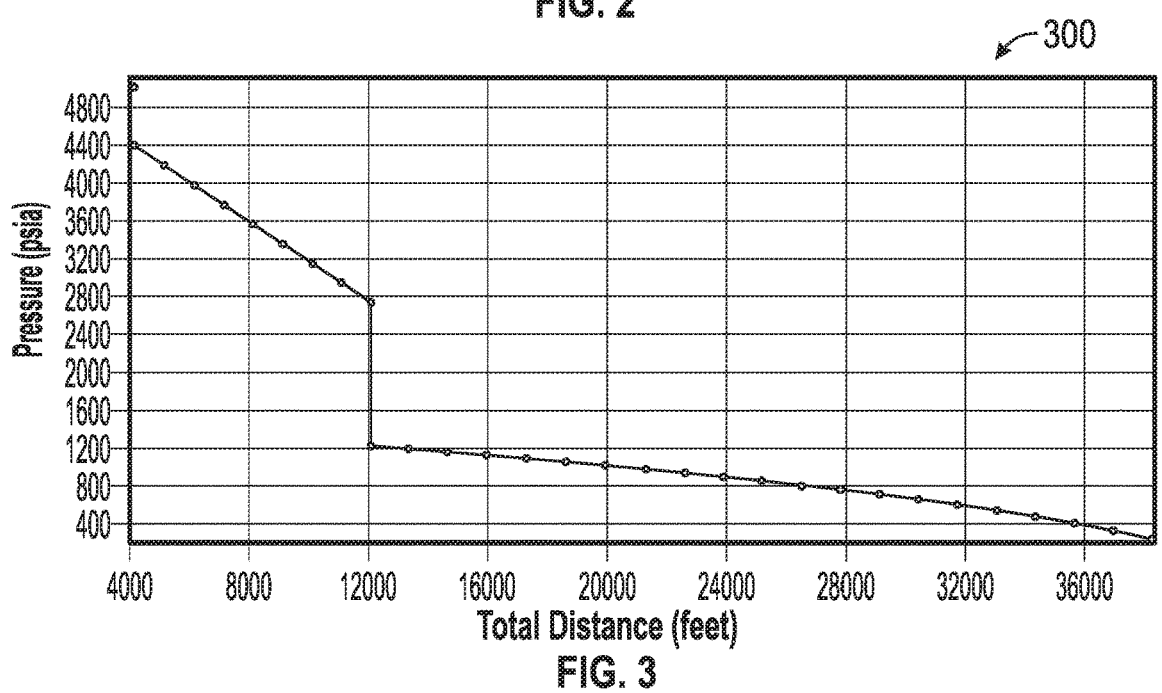
FIG. 3 illustrates a graph of the flow in the single branch production system of FIG. 2, according to some embodiments.

FIG. 2 illustrates a schematic view of a single branch production system 200, and FIG. 3 illustrates a graph 300 of the flow in the single branch production system of FIG. 2, according to some embodiments. Thus, in FIG. 2, the branch production system 200 includes reservoir 202, well floor 204, tubing head 206, choke 208, and separator 210. Steady-state and transient simulation software applications are used for several purposes. One purpose is for engineering design, to predict the behavior of a production system prior to construction. Here, the software application may be used to model various system scenarios that could be implemented, and the software application is used to help select the best design.

Another use for steady-state and transient simulation software applications takes place after the system has been designed, constructed, and put into operation. During daily operations, models are used to combine different types of measurements and available information in order to more fully understand system behavior. For example, FIG. 4 (the same single branch production system shown FIG. 2) indicates with circles the position of some types of measurements and available information that are described in Table 1.

TABLE 1

| Information | Location | Description |
| --- | --- | --- |
| $P_{res}\ T_{res}$ | Subsurface reservoir | Reservoir pressure from pressure transient analysis (PTA) or material balance analysis (MBA) |
| $P_{wf}\ T_{wf}$ | Subsurface bottom of the well | Well flowing bottomhole pressure-temperature sensor |
| $P_{th}\ T_{th}$ | Surface top of the well | Tubing head pressure-temperature sensor |
| $P_{ch}\ T_{ch}$ | Surface at outlet of the choke | Choke outlet pressure-temperature sensor |
| $P_{sep}\ T_{sep}$ | Surface at inlet of the fluid separator | Separator inlet pressure-temperature sensor |
| $Q_{oil}\ Q_{gas}\ Q_{water}$ | Surface, e.g. in the surface flowline or at the exit of the separator | Oil, water and gas rates measured using a multiphase flow meter (MPFM) or individual rates measured after the separator |

The general problem addressed is the use of available information to estimate multiphase flow rates throughout the system. Available information may include measurements such as pressure, temperature, and possibly flow rate data. Other information includes a steady-state or dynamic simulation software model that represents the production system and fluids. The model is at least occasionally calibrated against known flow rate measurement data. The use of a software simulation model to estimate flow rate is referred to as Virtual Rate Estimation ("VRE") or Virtual Flow Metering ("VFM"). There are several established approaches to VRE and VFM (hereafter referred to as VFM), which are briefly described in the two subsequent sections.

Measurements

Figure 4:
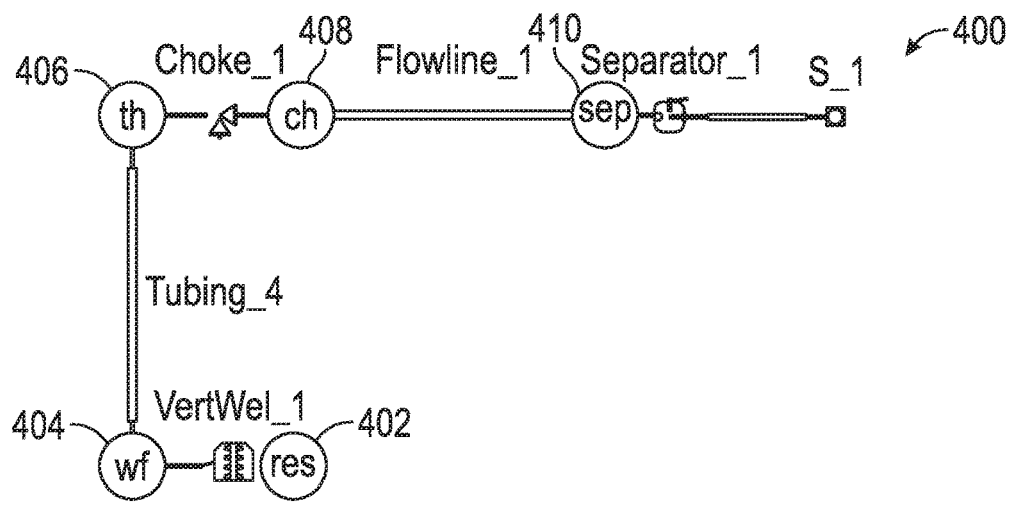
FIG. 4 illustrates a schematic view of another single branch production system, according to some embodiments.
Figure 5:
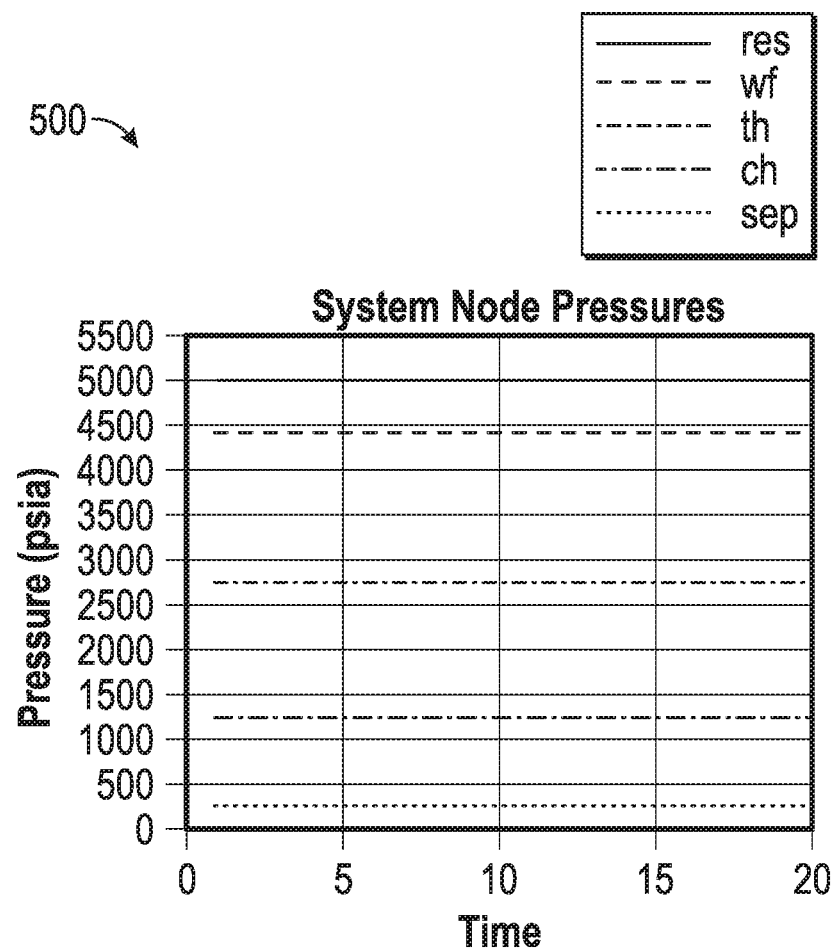
FIG. 5 illustrates a graph of the flow in the single branch production system of FIG. 4, according to some embodiments.

FIG. 4 illustrates a schematic view of another single branch production system 400, and FIG. 5 illustrates a graph 500 of the flow in the single branch production system 400 of FIG. 4, according to some embodiments. Continuing with the example in FIGS. 4 and 5, the circles in FIG. 4 indicate the position of representative pressure-temperature information and corresponding sensors, which are graphed versus time in FIG. 5. Thus, single branch production system 400 includes reservoir temperature and pressure sensors 402, well floor temperature and pressure sensors 404, tubing head temperature and pressure sensors 406, choke temperature and pressure sensors 408, and separator temperature and pressure sensors 410. Each of these sensor groups may also include a flow rate sensor. The pressure and temperature information (hereafter referred to as measurements or measurement data) available at time t will be denoted by a column vector (transpose is denoted using the ' symbol):

$$d(t) = [P_{res} T_{res} P_{wf} T_{wf} P_{th} P_{th} P_{ch} T_{ch} P_{sep} T_{sep}]' \quad \text{(Equation 1)}$$

In Equation 1, the subscript "res" denotes reservoir, "wf" denotes well floor, "th" denotes tubing head, "ch" denotes choke, and "sep" denotes separator. These denotations indicate the locations where the measurements are obtained.

Single Local Meter

In one approach to VFM, a single component of the production system, such as a wellbore tubing, is identified and used to estimate the flow rate through this specific component. This provides what is known as a "local meter." Steady-state and dynamic simulation uses knowledge about boundary conditions (e.g., pressure, temperature, or flow rates) at both the upstream entry point and the downstream outlet point of the modeled portion of the production system. Any part of the production system between two pressure-temperature-rate measurements may be taken as a local meter. For the example shown in FIGS. 4 and 5, some possible local meters are listed in Table 2. By grouping these models, other local meters are possible. For example, a well local meter (e.g., combined inflow and tubing models) could be defined between the reservoir and the tubing head.

TABLE 2

| Local Meter | Inlet P-T Measurements | Outlet P-T Measurements |
| --- | --- | --- |
| Inflow | Reservoir $P_{res}$ $T_{res}$ | Bottomhole well flowing $P_{wf}$ $T_{wf}$ |
| Tubing | Bottomhole well flowing $P_{wf}$ $T_{wf}$ | Tubing head $P_{th}$ $T_{th}$ |
| Choke | Tubing head $P_{th}$ $T_{th}$ | Choke outlet $P_{ch}$ $T_{ch}$ |
| Flowline | Choke outlet $P_{ch}$ $T_{ch}$ | Separator inlet $P_{sep}$ $T_{sep}$ |

Figure 6:
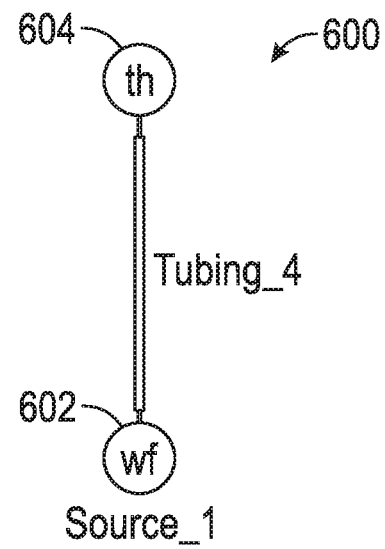
FIG. 6 illustrates a schematic view of a tubing local meter model, according to some embodiments.

FIG. 6 illustrates a schematic view of a tubing local meter model 600, according to some embodiments. For the case of a single local meter, FIG. 6 shows the PIPESIM® model for a representative tubing local meter. The tubing local meter is situated between the locations of inlet measurements 602 (e.g., bottomhole well flowing pressure $P_{wf}$ and temperature $T_{wf}$) and outlet measurements 604 (e.g., tubing head pressure $P_{th}$ and temperature $T_{th}$). As new bottomhole and tubing head pressure-temperature (P-T) measurements become available, these are combined with prior knowledge about the wellbore fluid and the available steady-state or transient tubing model in order to estimate the flow rates of oil, gas, and water through the wellbore tubing. This provides a virtual flow rate meter (VFM) estimate.

Multiple Local Meters

When a sufficient number of P-T measurements are available throughout the production system, such as the case shown in FIGS. 4 and 5, two or more local meters can be computed to obtain multiple flow rate estimates. For example, when the data in FIGS. 4 and 5 is available, flow rates can be computed using four local meters as listed in Table 2. A system to carry out these four local meters is illustrated in FIG. 7.

Figure 7:
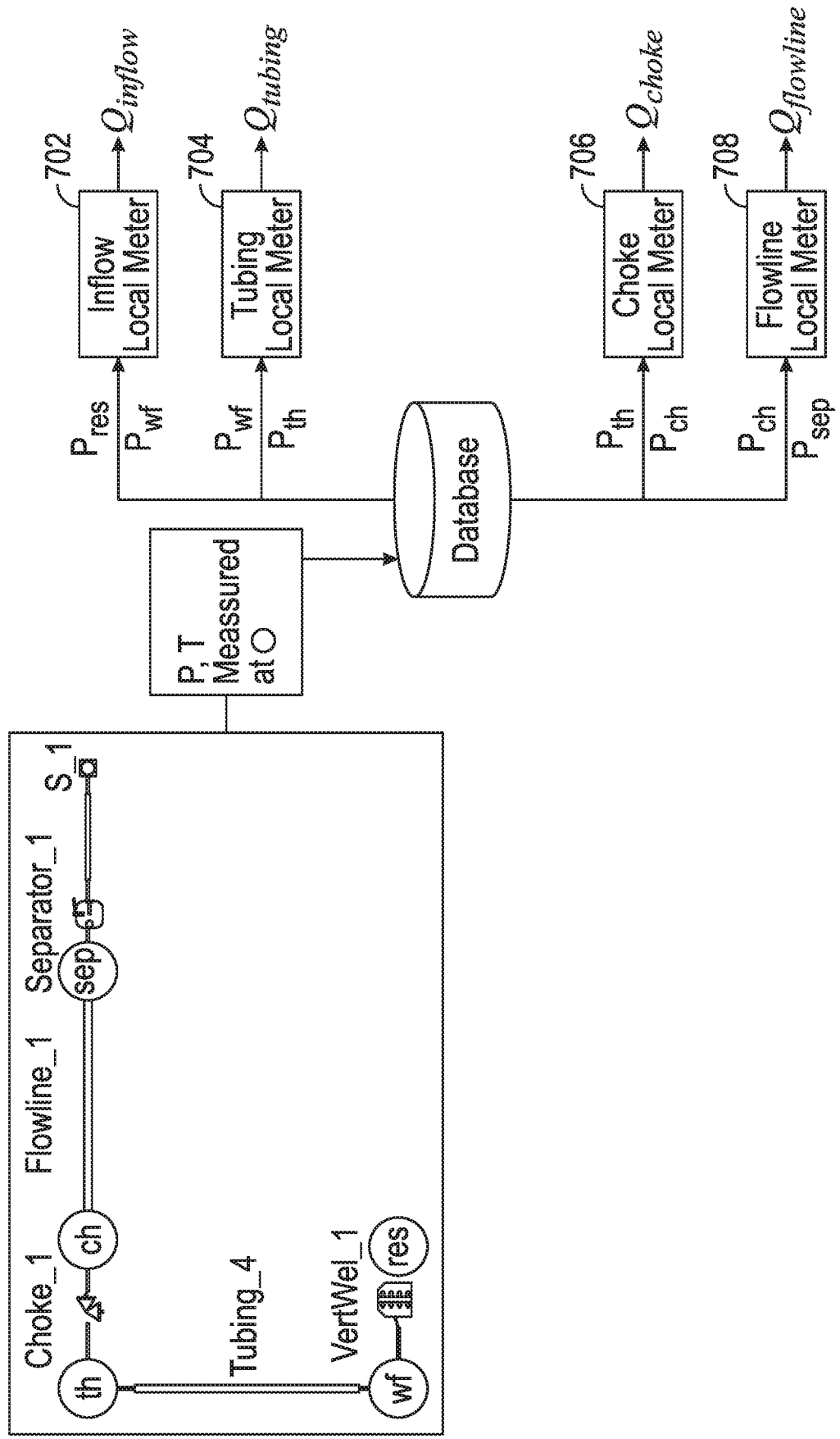
FIG. 7 illustrates a schematic view of four local meters receiving data from the single branch production system shown in FIG. 3, according to some embodiments.
Figure 8:
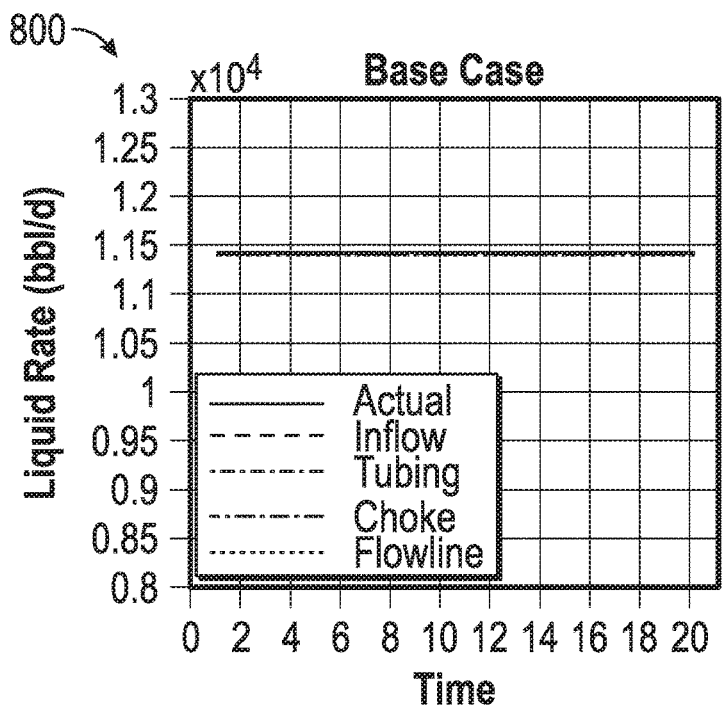
FIG. 8 illustrates a graph showing the flow rates from the four local meters in FIG. 7, according to some embodiments.

FIG. 7 illustrates a schematic view of four local meters 702, 704, 706, 708 receiving data from the single branch production system shown in FIG. 6, according to some embodiments. Under actual in situ flowing P-T conditions, the four flow rates computed using the four local meters 702, 704, 706, 708 may not be equal. In the hypothetical case of perfect (e.g., unbiased, noise-free) measurements under perfectly known steady-state conditions (e.g., same P-T conditions, for example expressed under standard conditions), would one expect the four local meter flow rates to be equal. As an illustration, using noise-free, unbiased P-T measurements shown in FIG. 5, four PIPESIM local meters can be used to compute four flow rates as shown in FIG. 8. FIG. 8 illustrates a graph 800 showing the flow rates from the four local meters 702, 704, 706, 708 in FIG. 7, according to some embodiments. In this ideal case, the four computed flow rates match.

Under more realistic operating conditions, measurement data is not unbiased and noise-free, and the fluid properties as well as the actual state of the production system are not perfectly known. Under practical conditions of noisy/uncertain data and partial knowledge about the fluids and production system, the question arises of how to combine local meter flow rates to estimate the actual multiphase flow rates in the system.

Challenges

Under practical operational field conditions, a number of challenges arise when attempting to combine multiple local meters as just described:

1) MEASUREMENT BIAS: measurement instrumentation error may occur where an additive offset or other type of bias corrupts an inlet or outlet pressure or temperature sensor. In another embodiment, as the reservoir is produced, the in situ pressure in the reservoir declines. Reservoir pressure can be estimated using techniques such as material balance and pressure transient testing, but at any moment, the actual reservoir pressure may be different from the reservoir pressure used in the model.
2) MODEL ERROR: discrepancy may exist between the model for the production system and the actual state. One example is choke erosion, where the choke interior body may be eroded by sand or other materials and the actual choke opening is larger than the choke opening in the model. Other production system components such as the well tubing and the flow line can also erode. Another example is scaling, waxing, or asphaltene formation, where the tubing or flow line accumulate material that causes the actual flowing cross-section to be smaller than the flowing cross-section in the model.

3) FLUID ERROR: as a reservoir is produced, the oil-water-gas phase make-up of the produced fluid changes over time. For example, the fraction of water in the produced liquid (i.e., watercut) or the ratio of gas to oil (i.e., gas-oil ratio) may increase over time. The phase fractions of water and gas in the production stream can be estimated from time to time (e.g., using a separator well test), or measured continuously (e.g., using a multiphase flow meter), or measured semi-continuously (e.g., using a multiphase flow meter on a test manifold where each of several wells is measured while the well is 'on test'). At any moment, there may be a difference between the actual and modeled fluid parameters.

Figure 9:
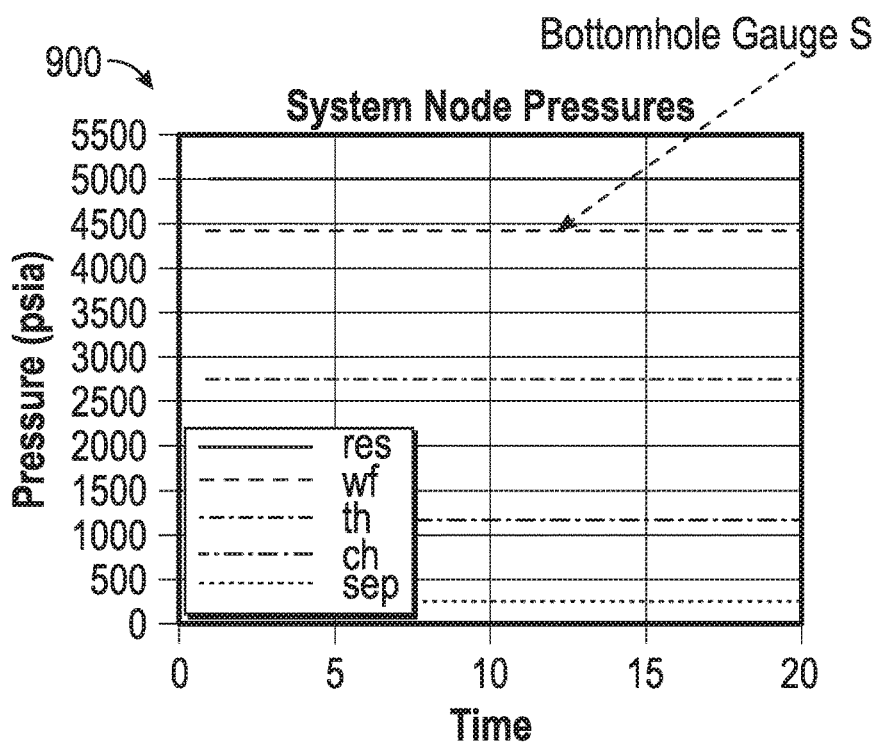
FIG. 9 illustrates a graph showing the effect of measurement bias on local meter flow rates, according to some embodiments.
Figure 10:
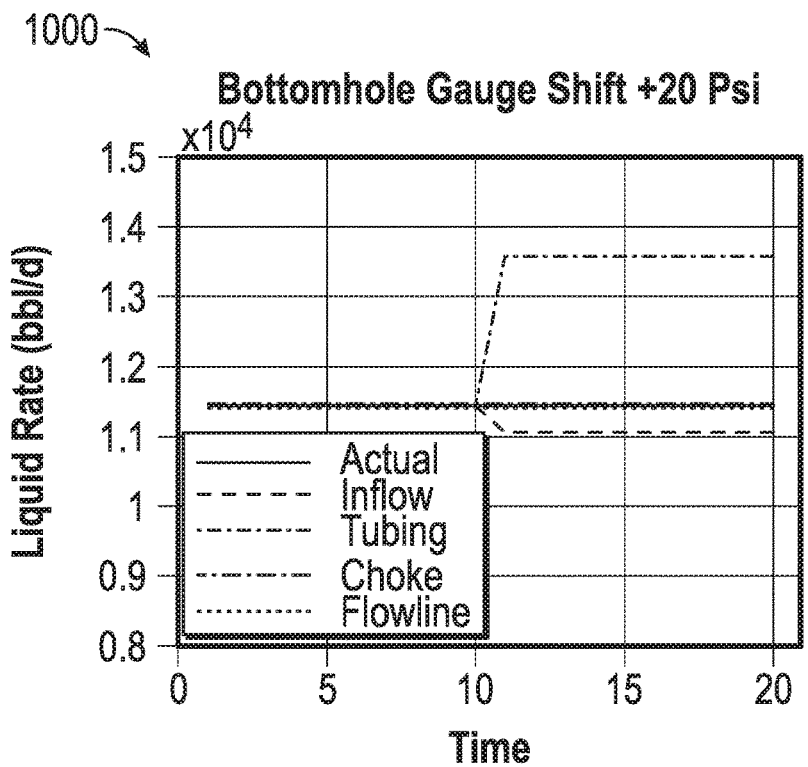
FIG. 10 illustrates another graph showing the effect of measurement bias on local meter flow rates, according to some embodiments.

FIG. 9 illustrates a graph 900 showing the effect of measurement bias on local meter flow rates, and FIG. 10 illustrates another graph 1000 showing the effect of measurement bias on local meter flow rates, according to some embodiments. The challenges above, as well as many other sources of discrepancy, have the potential to cause a mismatch among the local meter rate estimates. As an example of such discrepancy, FIGS. 9 and 10 show the effect of a measurement bias (e.g., a sudden 20 psi shift in bottomhole pressure reading at time 10) on the estimated local meter flow rates. Measurement bias leads to a characteristic signature or pattern in the behavior of the local meter flow rates: a single measurement bias affects two local meter rates, namely the local meter directly upstream of the biased measurement and the local meter directly downstream of the biased measurement, and the local meter errors occur in opposite direction. Here, the other local meters not "in contact" with the offending biased bottomhole measurement (e.g., namely the choke and flowline meters) continue to read the accurate value. The two local meters that are in contact with the bottomhole pressure measurement change in opposite directions—the tubing model reads too high and the inflow model reads too low.

Figure 11:
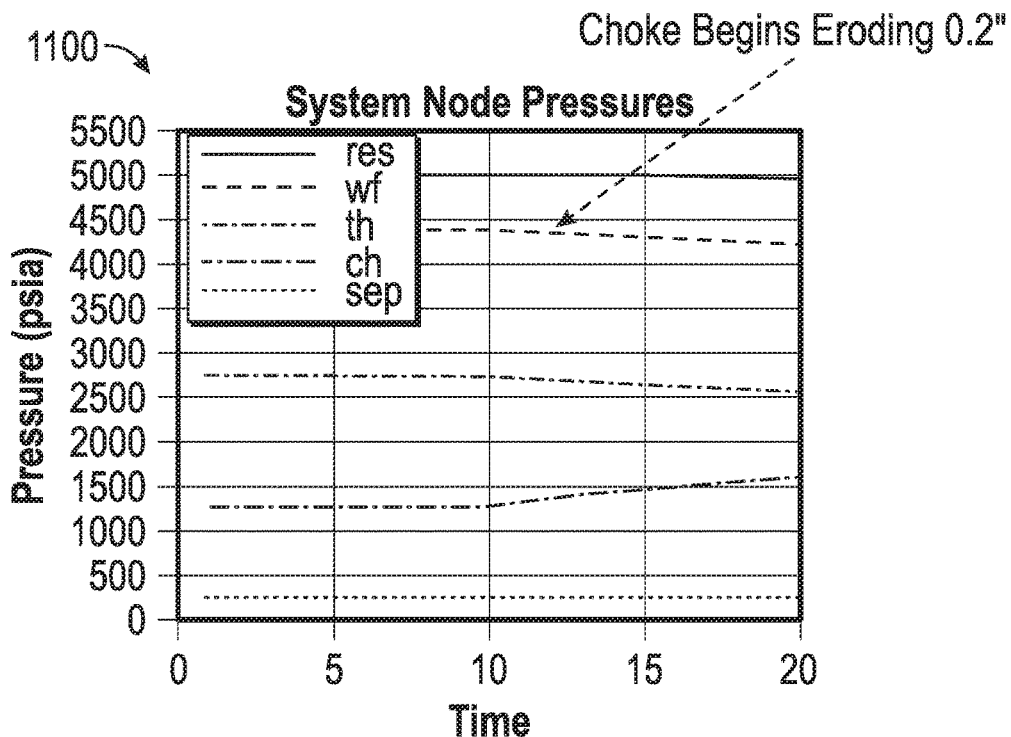
FIG. 11 illustrates a graph showing the effect of model error on local meter flow rates, according to some embodiments.
Figure 12:
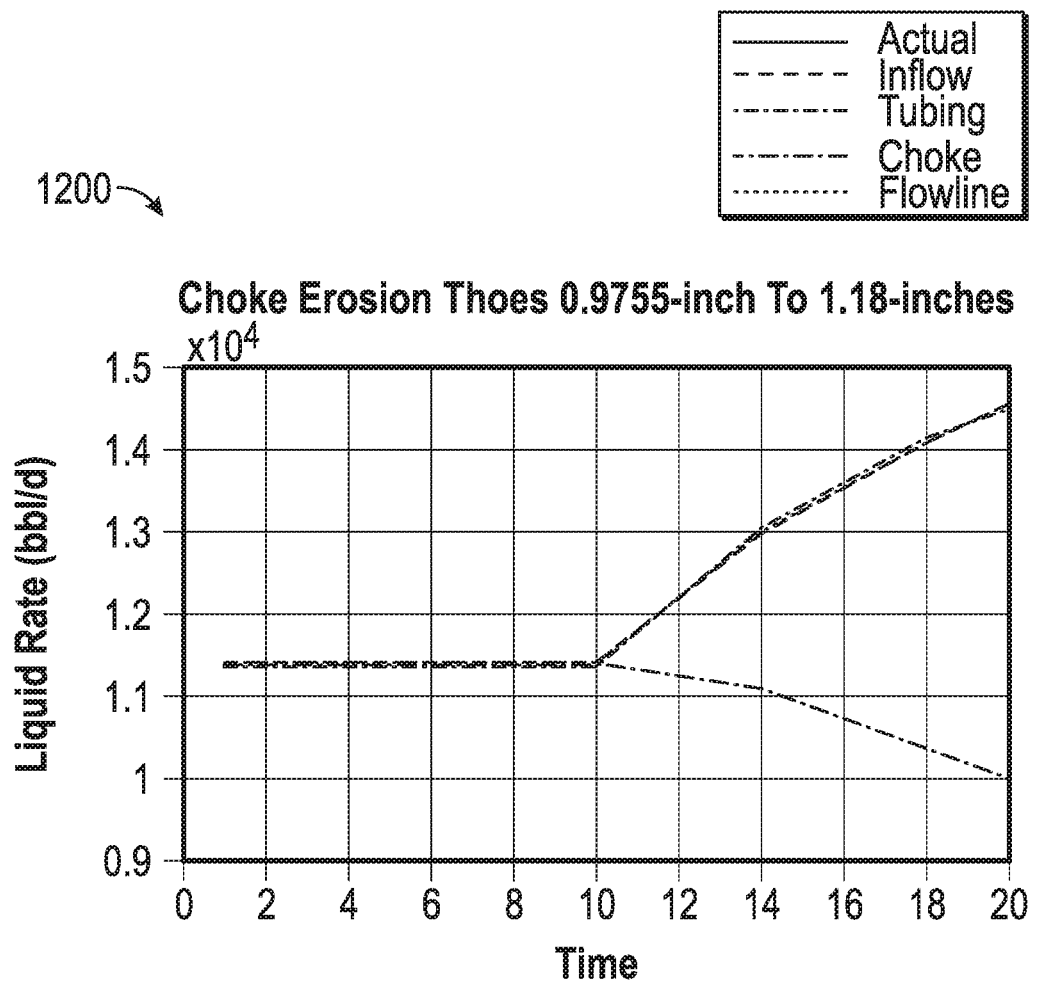
FIG. 12 illustrates a graph showing the effect of model error on local meter flow rates, according to some embodiments.

FIG. 11 illustrates a graph 1100 showing the effect of model error on local meter flow rates, and FIG. 12 illustrates a graph 1200 showing the effect of model error on local meter flow rates, according to some embodiments. As another example of discrepancy, FIGS. 11 and 12 show the effect of a modeling error (e.g., due to gradual choke erosion starting at time 10) on the estimated local meter flow rates. Here, when the choke gradually and continuously erodes starting at time 10 (i.e., the interior of the choke opens, mimicking an opening of the choke), the pressure difference across the choke (e.g., the difference between the bottom two dotted and solid curves in FIG. 11) is smaller than would be predicted by a choke without erosion. In this case, as shown in FIG. 12, starting at time 10 the choke local meter under-estimates the flow rate. Because the choke has effectively opened with erosion, the real flow rate though the branch has in fact increased. As shown in FIG. 12, the three other local meters agree with each other and track this real increase in flow rate.

II. Introduction to Two-Stage VMF

Figure 13:
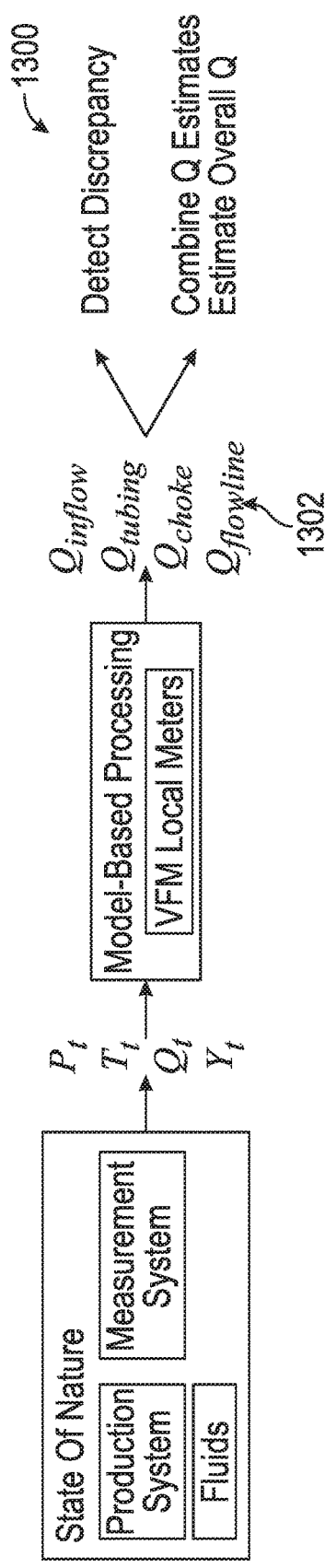
FIG. 13 illustrates a schematic view of a VFM approach, according to some embodiments.

FIG. 13 illustrates a schematic view of a VFM approach 1300, according to some embodiments. As illustrated in the two examples of FIGS. 9-12, for a specified production system, given a set of high-quality measurements, it is possible to use the local meter concept to detect certain discrepancy events such as the presence of choke erosion or measurement bias. This VFM approach is shown in FIG. 13 where local meter flow rates 1302 are computed, and these are used to detect discrepancies. Discrepancies in the local meter rates 1302 can be combined to estimate a single representative branch flow rate. In this approach, event discrepancies are identified from local meter rates 1302 either by direct human interpretation, or in a more automated fashion by applying data analytics, computer logic or pattern recognition to the set of estimated local meter rates (e.g., as done in FIGS. 9-12) to determine which of several discrepancy events may have occurred.

As can be appreciated, even for this simple production system including a single branch with four sensors and six discrepancy events, there are a number of challenges to extending this "pattern recognition" concept to much more general use in a modern large-scale production system that may exhibit a large number of sensors placed at various locations in an extensive interconnected production network, where the quality and availability of specific sensors can vary over time and the underlying system behavior may be transient rather than steady-state. Further, combining the local meter rates to estimate a single representative branch flow rate according to the prior art technique of computing a weighted average of such quantities does not work for transient pipeline simulation models, because there is no reason to expect that the individual local meter rates are consistent in the presence of a transient event.

Figure 14:
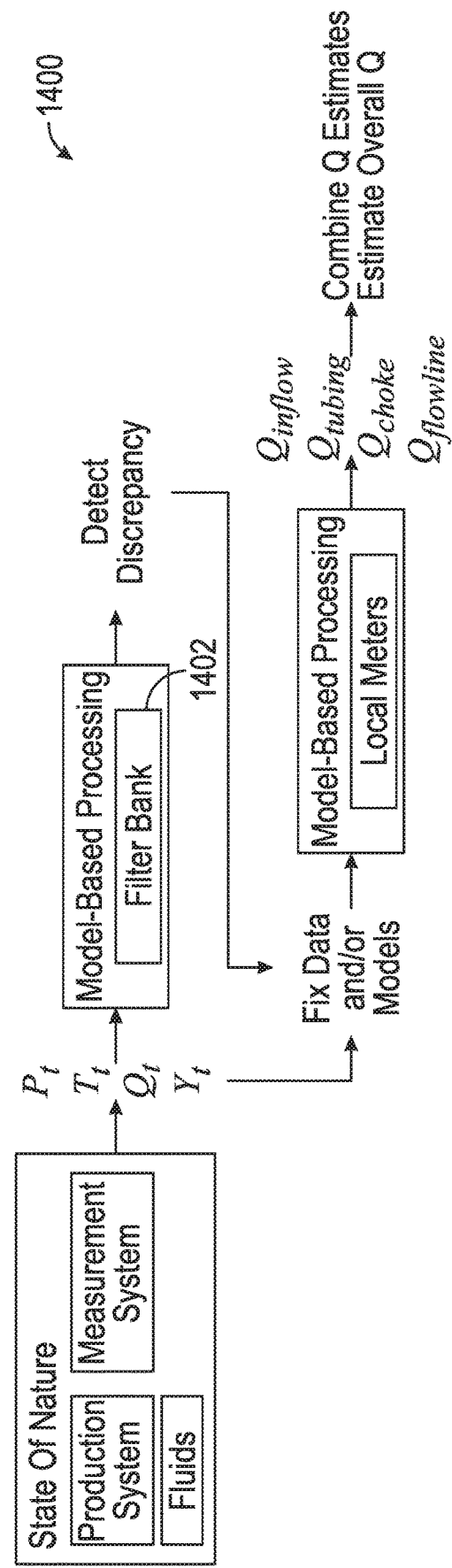
FIG. 14 illustrates a schematic view of a two-staged method for VFM, according to some embodiments.

FIG. 14 illustrates a schematic view of a two-staged method 1400 for VFM, according to some embodiments. The method 1400 may be implemented using hardware as shown and described below in reference to FIG. 30, for example. As opposed to the VFM approach shown in FIG. 13 that begins by computing local meter rates and uses these to sort out discrepancies, the VFM approach of FIG. 14 does not begin by computing local meter rates. Rather, this approach uses the measurement data simultaneously in a large-scale process of automated statistical model-based discrepancy event detection and classification, a computation that is carried out using a large filter bank 1402 of parallel Bayesian detection filters. The filter bank 1402 leverages the huge computational power available with modern computers, and transforms the largely manually-configured discrepancy pattern detection problem of FIG. 13 with a direct computation able to handle a large collection of possible discrepancy events that could not be managed manually. In this approach, the probability of each potential discrepancy event is computed directly from the available uncertain measurements using a Bayesian probabilistic computation.

Figure 15:
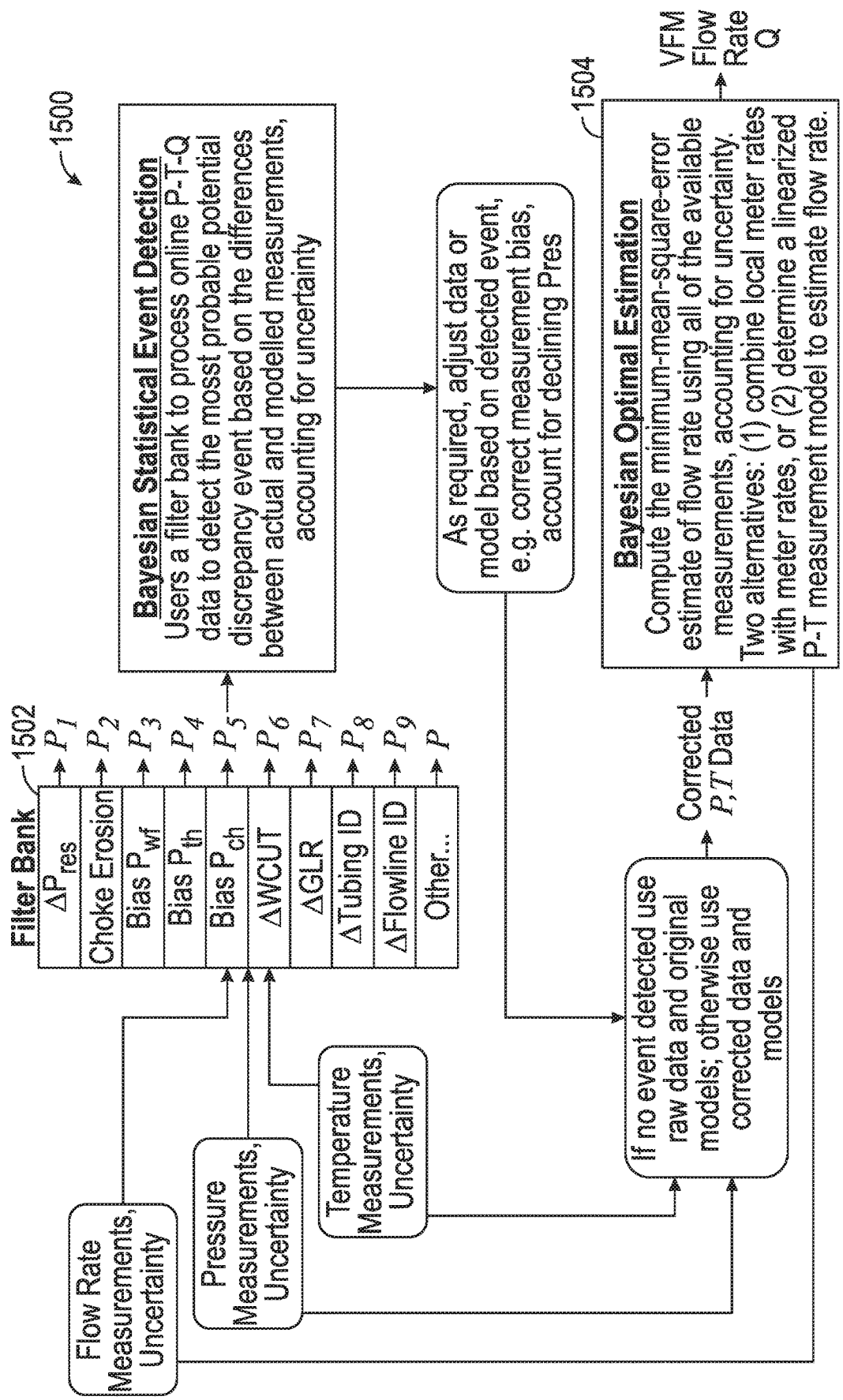
FIG. 15 illustrates a schematic view of statistical detection and estimation for VFM, according to some embodiments.

FIG. 15 illustrates a schematic view of a statistical detection and estimation technique for VFM 1500, according to some embodiments. This system may be implemented using hardware as shown and described below in reference to FIG. 30, for example. Unlike the systems of FIGS. 13 and 14, the technique of FIG. 15 does not compute local meters in order to determine a VFM representative flow rate. FIG. 15 presents the proposed two-stage method for VFM in more detail:

Bayesian statistical event detection—a model-based Bayesian detection filter bank 1502 is implemented that continually computes the a posteriori probability of each of a number of potential discrepancy events, such as a change in reservoir pressure, a change in fluid phase fraction, a change in the physical system such as choke erosion or flowline solids deposition, or the presence of a bias in one of the measurements. The filter bank 1502, which performs a number of simulation model computations, makes use of the available measurements (e.g., the type of measurements available can vary from one time to the next), accounting for measurement uncertainties. This is a recursive Bayesian probability computation that tracks, from one time to the next, the probability of each discrepancy event. These probabilities are used to decide which one of the events has occurred, for example, when the computed probability value becomes larger than a threshold or when the computed probability is the largest among the set of the probabilities.

Bayesian statistical estimation of flow rate—after detecting a discrepancy event, the measurement data or models may be modified (e.g., by removing a measurement bias, adjusting the modelled value of choke bean or Cv coefficient or diameters of tubular components, or decreasing the value of $P_{res}$). The modified data and models can then be used to implement local meters. The local meter flow rates computed from P-T data can then be combined with measured flow rates (e.g., multi-phase flow meter rates, if available) and processed by a linear Bayesian minimum mean-square error (MMSE) estimator 1504. This estimator 1504 uses the measurements, accounting for measurement uncertainties. It weights the data and determines the estimate of branch flow rate. This process is described in more detail in a subsequent section.

Ideas are illustrated above for a case of a single flow rate (e.g., liquid flow rate) in a single branch steady-state model such as the one in FIGS. 4 and 5. More generally, these methods apply to each of multiple rates (e.g., oil, water and gas flow rates) in multi-branch and time-varying or transient networks. In the more general case, the method may estimate more than one flow rate as a function of time in the network.

III. Bayesian Statistical Event Detection

Let $S=\{S_0, S_1, \ldots, S_N\}$ denote the set of N+1 discrepancy events or scenarios that could potentially occur in the current system. Scenario $S_0$ refers to the base case (e.g., no discrepancy event); scenarios $S_1, \ldots, S_N$ refer to various events such as the ones listed under "Filter Bank" in FIG. 15. The system and method disclosed herein include a recursive computation carried out at each time $t=t_1, \ldots, t_{k-1}, t_k, t_{k+1}, \ldots$; the current time is represented as $t_k$. After the computation at time $t_k$, the a posteriori probability that discrepancy event $S_1$ has occurred is denoted as $$P_k(S_j) j=0,1,2,\ldots,N \quad \text{(Equation 2)}$$

The initial a priori probabilites are denoted as $P_0(S_j)$. The probabilities in Equation 2 each have a value between zero and one, and the N+1 probabilities sum to one.

For each potential discrepancy event $S_j$ the simulation model (e.g., steady-state PipeSIM or transient OLGA, single-branch or network) can be used to compute a column vector of expected measurements at time $t_k$, denoted as $m_{kj}$. The filter bank event detector may not be based on the local meter concept, and thus can be implemented with both steady-state and transient model simulation methods. A representative result of computing pressures at 5 measurement sensor locations for the base case $S_0$ is shown in FIG. 4. More generally, at time $t_k$ the full set of 10 simulated measurements for a base case $S_0$ with $P_{res}$ equal to 3000 psi are:

$$m_{k0}=[P_{res}T_{res}P_{wf}T_{wf}P_{th}T_{th}P_{ch}T_{ch}P_{sep}T_{sep}]'=$$
$$[3000.0200.02653.2200.41337.1167.9721.2166.925\ldots]' \quad \text{(Equation 3)}$$

Because the actual sensor readings are not precise, they are represented in the model as the computed (e.g., expected) measurement data under the given discrepancy event, plus some level of uncertainty, represented as zero-mean additive noise. Specifically, under scenario $S_j$ with noise-free 10-dimensional measurement $m_{kj}$, the actual noisy 10-dimensional measurement $r_{kj}$ at time $t_k$ is represented as:

$$r_{kj}=m_{kj}+w_k w_k\sim N(0,\Sigma) \quad \text{(Equation 4)}$$

In Equation 4, the 10-dimensional additive noise $w_k$ is described by a Gaussian or normal probability density function (PDF), having zero mean and a 10×10 covariance matrix $\Sigma$. The PDF for the measurement $r_k$ at time $t_k$, assuming discrepancy event $S_j$ has occurred, is described probabilistically by the following equation, where the number of measurements L=10, and the vertical bar notation on the left side of the equation denotes "given", $$P(r_k \mid S_j) = \frac{1}{(2\pi)^{0.5L}|\Sigma|^{0.5}} \exp\left[-\frac{1}{2}(r_{kj}-m_{kj})'\Sigma^{-1}(r_{kj}-m_{kj})\right] \quad \text{(Equation 5)}$$
$$j=0,1,\ldots,N$$

In this equation, the mean value of measurement $r_{kj}$ given discrepancy event $S_j$ has occurred is the 10-dimensional simulated measurement $m_{kj}$. It is instructive to consider how distinct these signals are over the set of potential scenarios, compared both to the base case mean measurement, as well as to each other.

Figure 16:
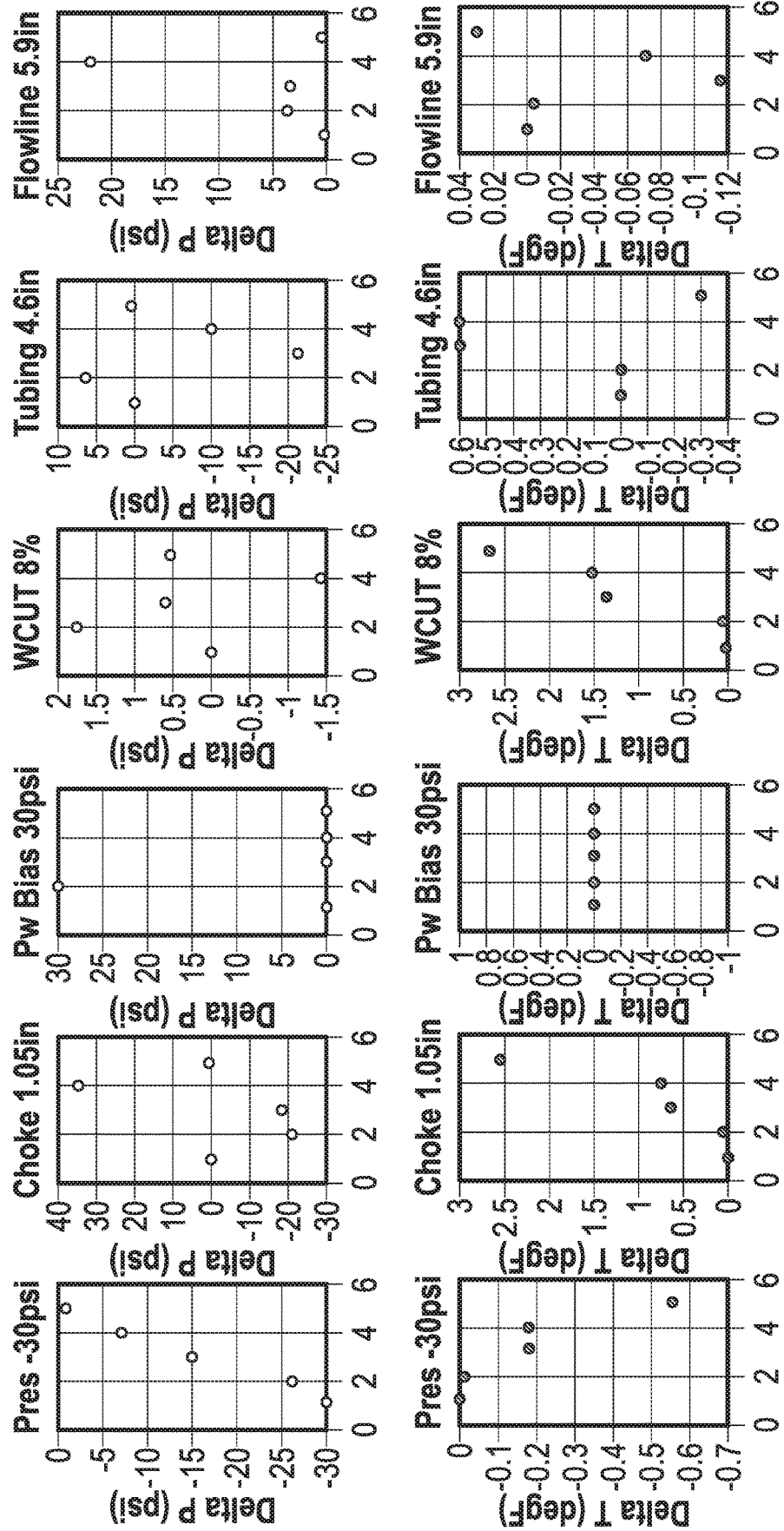
FIG. 16 illustrates measurement difference patterns (relative to a base model) corresponding to six discrepancy events, according to some embodiments.

For the single branch model shown earlier in FIGS. 4 and 5, but with $P_{res}$ equal to 3000 psi, the pressure-temperature simulated measurement mean values $m_{kj}$, relative to the base case, are shown in FIG. 16. The six panels across FIG. 16 correspond to the following discrepancy events:

1. Pres −30 psi: the reservoir pressure drops from 3000 psia to 2970 psia;
2. Choke 1.05 in: the choke erodes from a nominal 1.00" bean or opening to a 1.05" bean;
3. Pwf Bias 30 psi: a constant 30 psi offset is added to the $P_{wf}$ measurement
4. WCUT 8%: The fluid watercut increases from 4% to 8%
5. Tubing 4.6 in: The tubing ID reduces due to scaling or solid build-up from 5.0 inches to 4.6 inches;
6. Flowline 5.9 in: The flowline ID reduces due to solids accumulation from 6.0 inches to 5.9 inches.

FIG. 16 illustrates measurement difference patterns (e.g., relative to a base model) corresponding to six discrepancy events, according to some embodiments. In FIG. 16, the 6 panels in the top row show pressure discrepancy patterns, and the 6 panels in the bottom row show temperature discrepancy patterns, where the discrepancies are relative to the base case. Each panel displays 5 points that correspond to the location of the 5 P-T measurements: 1=reservoir, 2=well flowing, 3=tubing head, 4=choke outlet, and 5=separator inlet.

For a given discrepancy event $S_j$, Equation 5 corresponds to the so-called "forward problem," namely, evaluating the PDF for the measurement $r_k$ given that discrepancy event $S_j$ has occurred. The "inverse problem" is then addressed, that is: given an observed measurement $r_k=R_k$ at time $t_k$, the user may determine the probability of discrepancy event $S_j$ by calculating the a posteriori probability of each discrepancy event $S_j$ given the measurement $R_k$:

$$P_k(S_j)=P(S_j \mid r_k=R_k) j=0,1,\ldots,N \quad \text{(Equation 6)}$$

Bayes updating provides a direct means of computing Equation 6 in terms of quantities known from Eq. 2 and Eq. 5 as follows:

$$P_k(S_j) = P(S_j \mid r_k = R_k) = \frac{P(r_k = R_k \mid S_j) P_{k-1}(S_j)}{\sum_{j=0}^{N} P(r_k = R_k \mid S_j) P_{k-1}(S_j)} \quad \text{(Equation 7)}$$

$$j = 0, 1, \ldots, N$$

Equation 7 provides a direct means to compute, from one time to the next, the probability that the system has moved into a state corresponding to discrepancy event $S_j$. Alerts can be implemented based on the behavior of these probabilites, in order to (1) warn that the system has moved away from the base case $S_0$, and (2) provide a pre-diagnostic that the system appears to be approaching the root cause scenario having the largest a posteriori probability in Equation 7.

Figure 17:
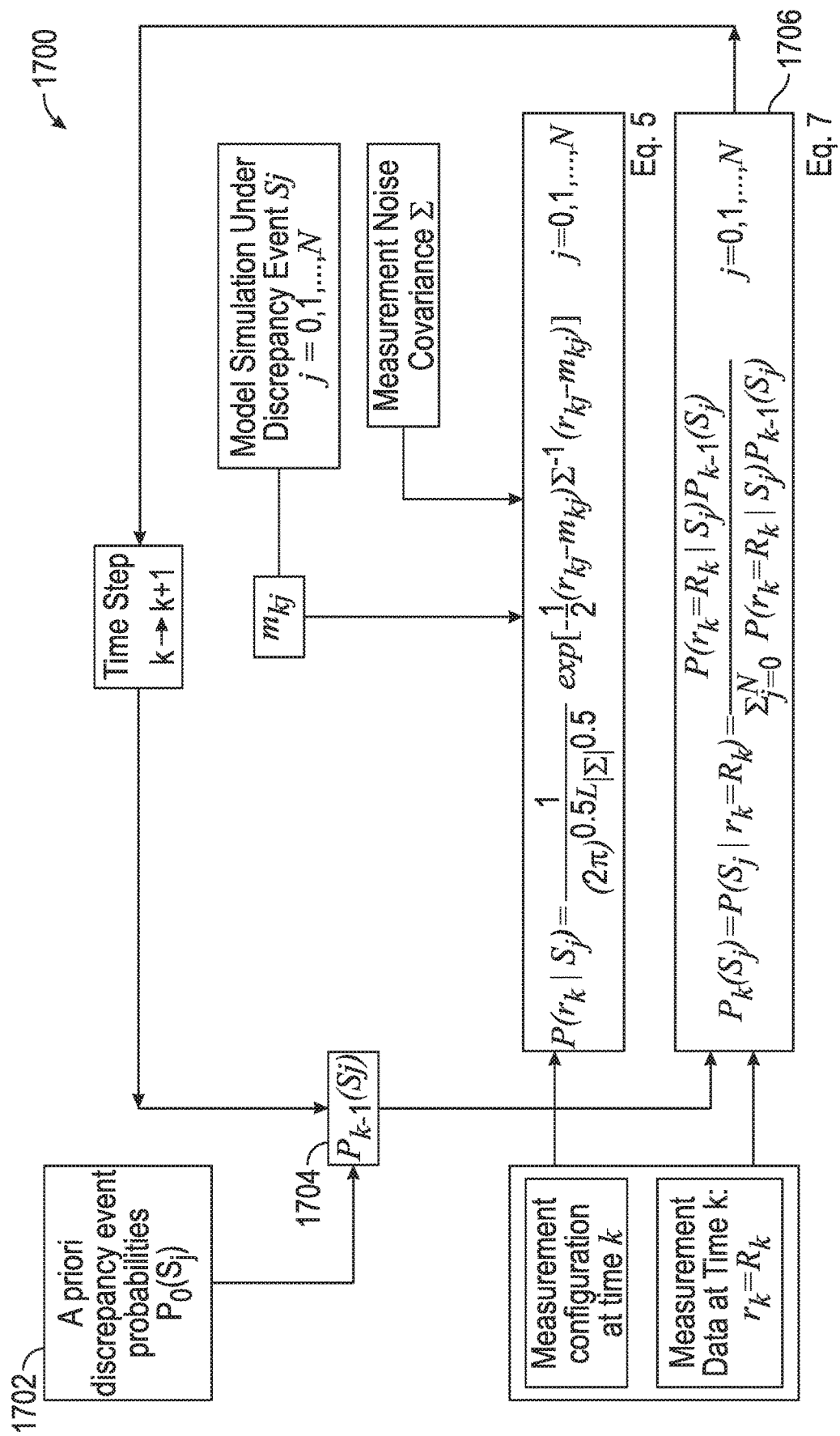
FIG. 17 illustrates a schematic view of a discrepancy event detector, according to some embodiments.

FIG. 17 illustrates a schematic view of a discrepancy event detector 1700, according to some embodiments. The discrepancy event detector 1700 may be implemented using hardware as shown and described below in reference to FIG. 30, for example. A flow chart of the method described in Equation 1 through Equation 7 is shown in FIG. 17. Equation 7 is a Bayesian update computation of the probabilites of discrepancy events over time. The a priori start-up probabilities $P_0(S_j)$ are represented at block 1702. As shown in the figure, the a posteriori event probability output $P_k(S_j)$ 1706 at one time serves as the prior probability input $P_{k-1}(S_j)$ 1704 at the next time. If the configuration of available measurements changes with time, the approach described here remains intact and the nature of the probability calculations in Equation 5 and Equation 7 change. For example, at a time where additional flow rate information is available, an additional single phase flow rate (e.g., oil rate) or a set of three multiphase flow rates (oil, water, gas rate) can be introduced. Equation 7 still applies where the number of measurements L increases by one or three.

The method in this flow chart is illustrated with an example. The steady-state PIPESIM® model in FIGS. 2 and 3 was used to simulate P-T data at the 5 locations shown in FIGS. 4 and 5 (e.g., 240 time increments of 6 hours, that is, 4 samples per day for 60 days). Seven scenario cases were simulated, and the seven cases all begin with the model in the base case $S_0$ for the first 10 days. After this, each model shifts to one of the six discrepancy event cases shown in FIG. 16, as well as one simulation corresponding to the base case. Zero-mean uncorrelated Gaussian random noise was added to each of the simulated measurements. The standard deviation of pressure measurement noise was set to 3 psi, and the standard deviation of temperature measurement noise was set to 0.5° F. These levels of additive measurement noise are representative of medium quality modern pressure-temperature gauges. Compared to the P-T signal amplitudes in FIG. 16, these noise levels correspond to a favourable signal-to-noise ratio and are expected to lead to good detection results.

Figure 18:
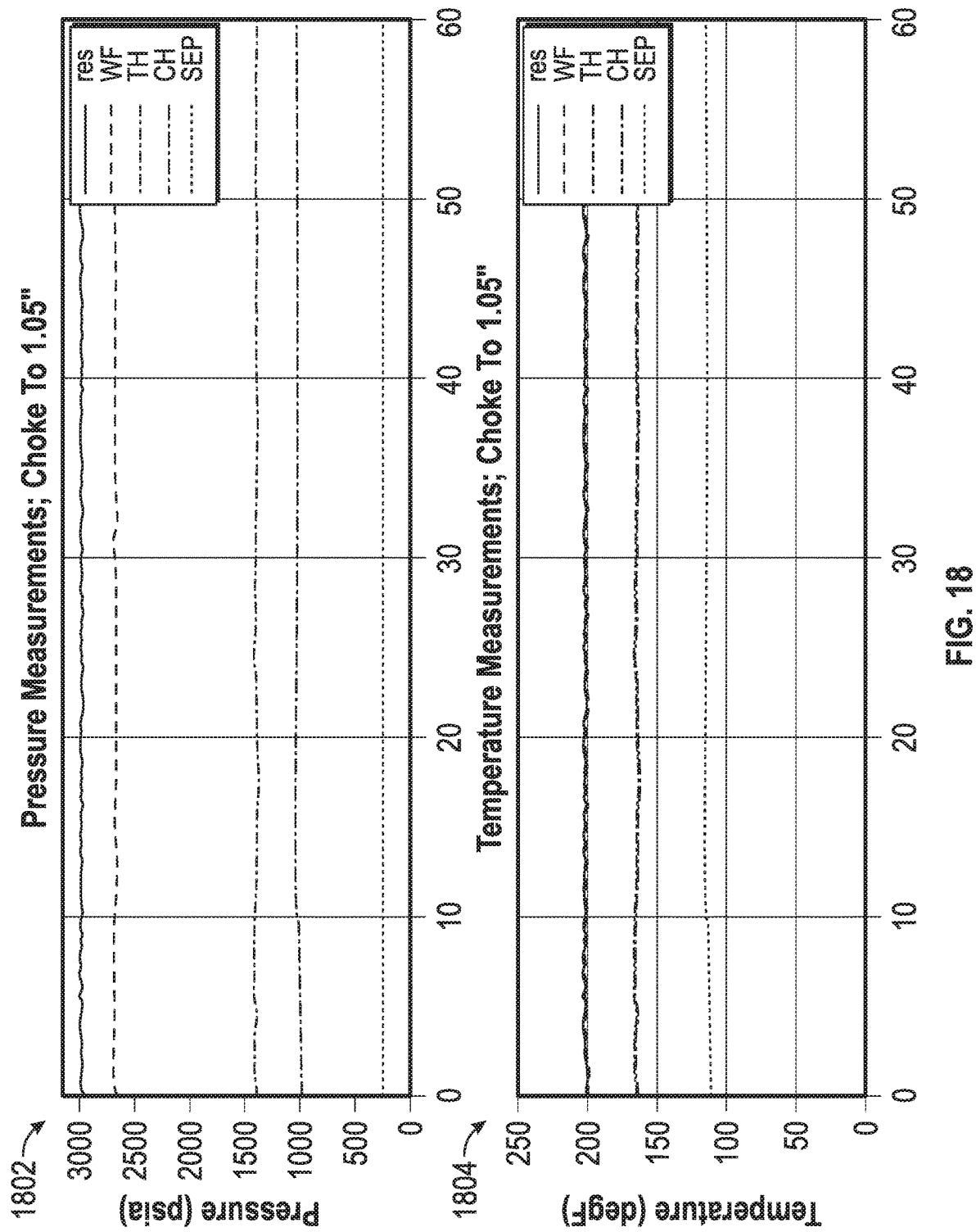
FIG. 18 illustrates a graph showing simulated noise P data for a choke erosion case $\sigma_P=3$ psi, according to some embodiments, and a graph showing simulated noise T data for a choke erosion case $\sigma_T=0.5°$ F., according to some embodiments.

FIG. 18 shows an example of the noisy P-T data for the choke erosion case. More particularly, FIG. 18 illustrates a graph 1802 showing simulated noise P data for a choke erosion case $\sigma_P$=3 psi, and a graph 1804 showing simulated noise T data for a choke erosion case $\sigma_T$=0.5° F., according to some embodiments. The parameters $\sigma_P$ and $\sigma_T$ may be user settable.

Figure 19:
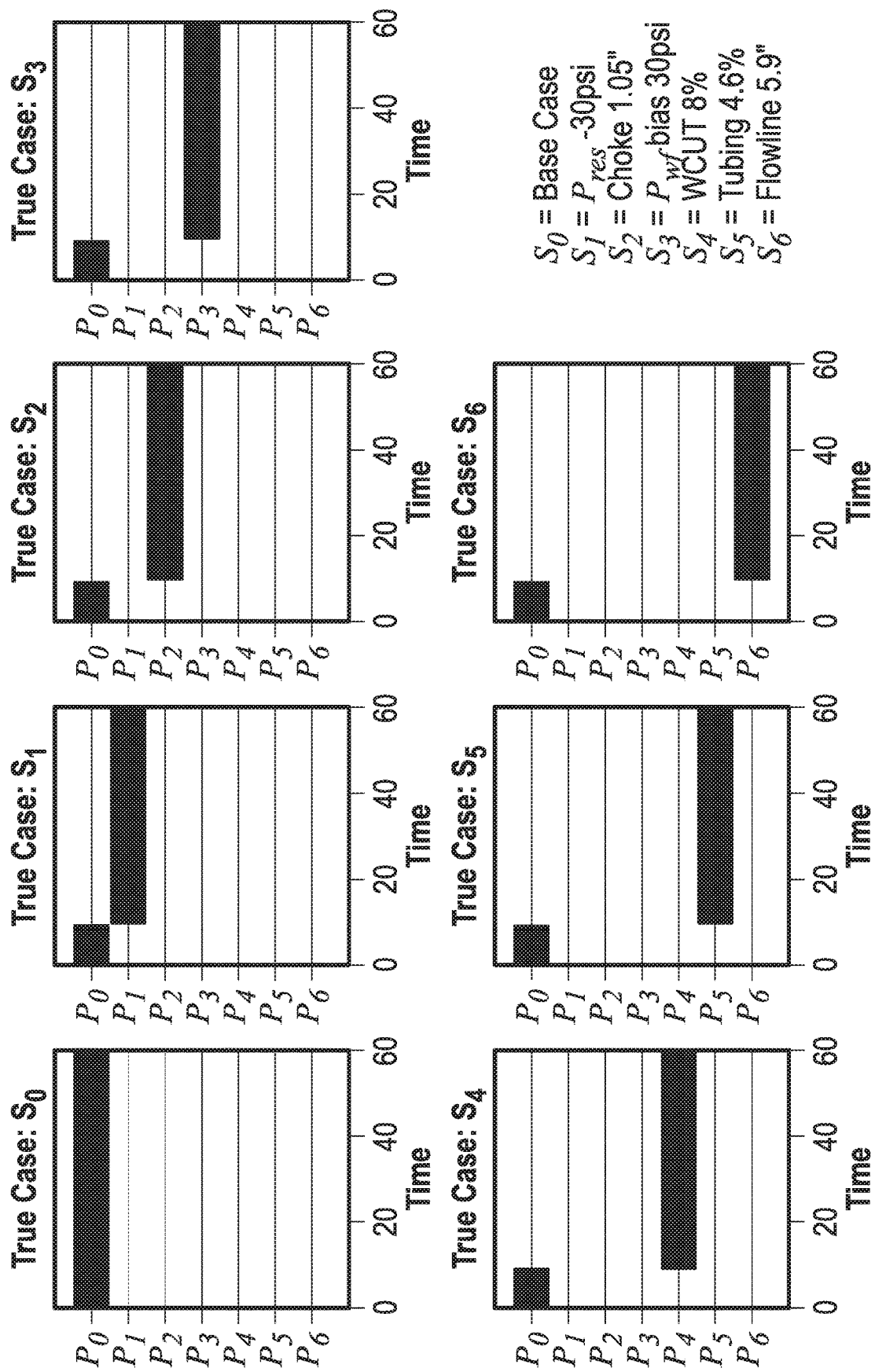
FIG. 19 illustrates probabilities $P_k(S_j)$ versus time for a choke erosion case with $\sigma_P=3$ psi and $\sigma_T=0.5°$ F., according to some embodiments.

FIG. 19 displays the event probabilites computed over the 60 day period under each of seven different simulated event scenarios. More particularly, FIG. 19 illustrates a posteriori probabilities $P_k(S_j)$ versus time with $\sigma_P$=3 psi and $\sigma_T$=0.5° F., according to some embodiments. For each of these seven plots, the horizontal axis is time, and the vertical axis corresponds to the simulated events. The width of the bar corresponds to the computed probability between zero and one. In these cases, it can be seen that the detector filter bank computes a probability of one for the base case up to time t=10 for all seven simulated scenarios. After this time, the computed probabilities for each of the six cases other than the base case become close to unity, and because the signal-to-noise ratio is favorable, the filter bank in each case accurately identifies the correct scenario.

To evaluate performance of the filter bank statistical detector, the simulated data noise level was increased. By inspection of the scenario pressure and temperature signal levels in FIG. 16, it can be seen that: (1) the peak-to-peak amplitude variation of the pressure data is approximately 30 psi for the scenario patterns except the watercut case, which has a signal level of approximately 3 psi; (2) the peak-to-peak amplitude variations of the temperature data are small (e.g., less than 1° F.) for the scenario patterns except the watercut and choke cases, where the signal level is approximately 3° F. For the first example illustrated in FIGS. 18A, and 18B and FIG. 19, the watercut case was successfully detected, largely because the approximately 3° F. temperature response to watercut reduction is well above the temperature noise level of 0.5° F. (e.g., the pressure response is at the noise level). When the noise level of the simulated temperature data is increased, it is expected that most of the filter bank detectors may continue to function properly because of their respective pressure response signatures have high signal-to-noise ratio. The increased watercut case, whose detectability depends mostly on the temperature signal, is expected to have some difficulty successfully detecting the scenario as the temperature sensor noise level increases.

Figure 20:
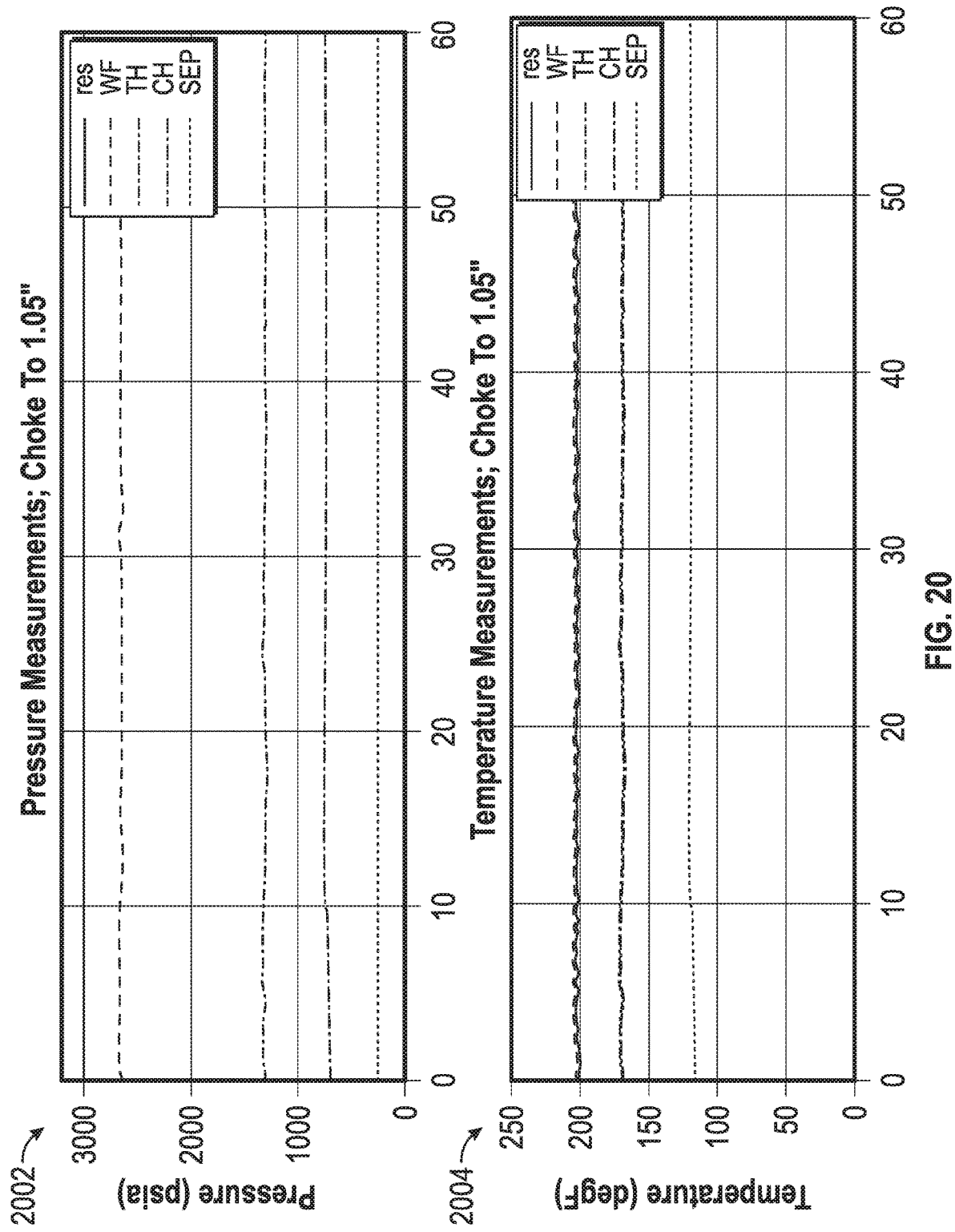
FIG. 20 illustrates a graph showing simulated noise PT data for a choke erosion case $\sigma_P=3$ psi, according to some embodiments, and a graph showing simulated noise T data for a choke erosion case $\sigma_T=1.0°$ F., according to some embodiments.

A second simulated measurement example is now presented, where the standard deviation of pressure measurement noise was set to 3 psi (i.e., same as the previous example), and the standard deviation of temperature measurement noise was increased to 1.0 deg F. FIG. 20 shows an example of the noisy P-T data for the choke erosion case. More particularly, FIG. 20 illustrates a graph 2002 showing simulated noise P data for a choke erosion case $\sigma_P$=3 psi, and a graph 2004 showing simulated noise T data for a choke erosion case $\sigma_T$=1.0° F., according to some embodiments.

Figure 21:
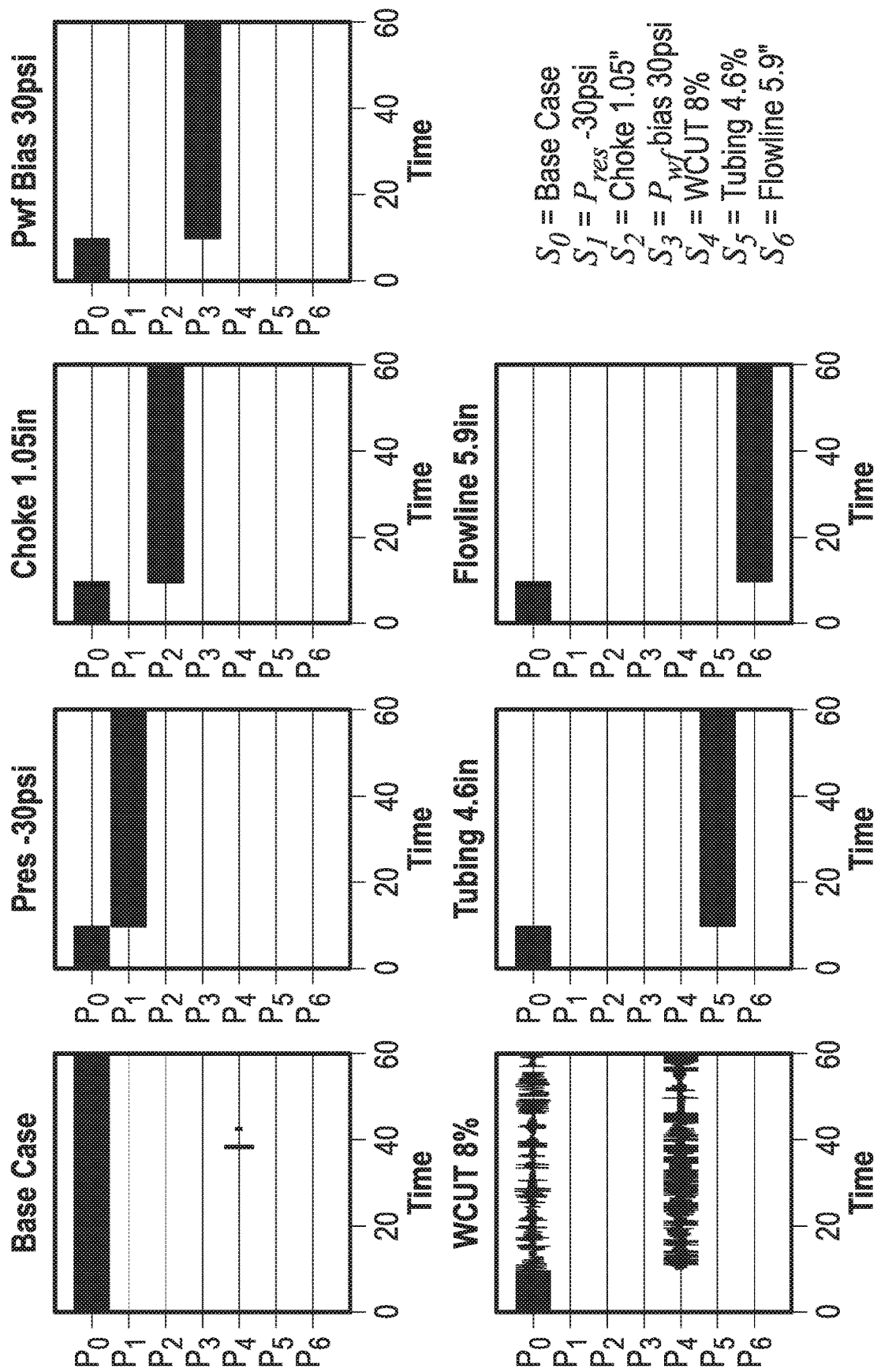
FIG. 21 illustrates probabilities $P_k(S_j)$ versus time for a choke erosion case with $\sigma_P=3$ psi and $\sigma_T=1.0°$ F., according to some embodiments.

FIG. 21 displays the Bayesian event probabilites computed for each of the seven event scenarios. More particularly, FIG. 21 illustrates a posteriori probabilities $P_k(S_j)$ versus time with $\sigma_P$=3 psi and $\sigma_T$=1.0° F., according to some embodiments. As expected, the detector bank computes a probability of one for all seven scenarios that are under the base case condition up to time t=10. After this time, the computed probabilities for cases other than the base case are well behaved except for the case of watercut increase. Because the temperature signal-to-noise ratio is unfavorable, the filter bank has difficulty distinguishing the case of watercut increase from the base case.

IV. Bayesian Estimation of Flow Rate Using Local Meters

Figure 22:
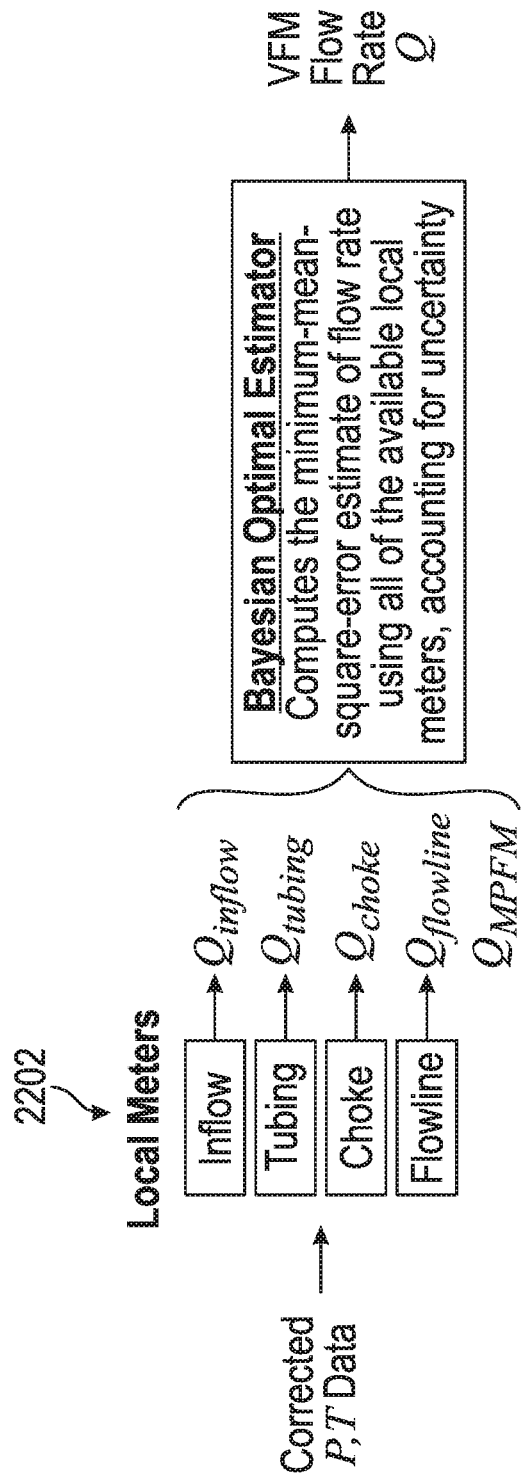
FIG. 22 illustrates a Bayesian estimation of flow rate using local meters.

As shown earlier in FIG. 15, once a discrepancy has been detected, the effect of that discrepancy can lead to modification of the production system model and/or fluid models (e.g., by resetting the modelled value of reservoir pressure, choke bean, watercut, tubing diameter, or flowline diameter) or the data itself (e.g., removing a detected measurement bias). The second stage of the VFM approach includes combining the possibly modified available P, T and Q measurement data at time $t_k$ together with the possibly modified steady-state or transient thermal-hydraulic model, to compute the best estimate of branch flow rate. There are at least two ways to use the possibly modified P-T data and model, one based on optimal estimation using local meter rate calculations and another based on optimal estimation using the modified P-T data directly. FIG. 22 illustrates the use of modified P-T data as input to a set of local meter rate calculations, as described earlier in FIG. 7. More particularly, FIG. 22 illustrates an estimation of flow rate using local meters 2202 whose inputs are the modified or corrected P-T data.

The output of the local meter calculations is a set of flow rates $Q_{inflow}$, $Q_{tubing}$, $Q_{choke}$, $Q_{flowline}$. These can be combined with other flow rate information available at this time (e.g., a multiphase flow meter measurement $Q_{MPFM}$) to form a composite set of flow rate measurements. Consider two cases:

CASE 1: P-T Measurements, No Flow Rate Measurement

In this case, for illustration consider that four local meter flow rates are available. A vector measurement equation may be written as $$z_k = \begin{bmatrix} Q_{inflow} \\ Q_{tubing} \\ Q_{choke} \\ Q_{flowline} \end{bmatrix} = \begin{bmatrix} 1 \\ 1 \\ 1 \\ 1 \end{bmatrix} q_k + v_k = H_k q_k + v_k \quad \text{(Equation 8)}$$

$$v_k \sim \mathcal{N}(0, \Lambda_v)$$

Here, $q_k$ is the single branch flow rate that is to be estimated from the N=4 measurements. $z_k$ is an (N×1) vector of the four local flow meter estimates. $H_k$ is an (N×1) column vector of ones.

CASE 2: P-T Measurements and Flow Rate Measurement are Available

In this case, for illustration consider that four local meter flow rates are available in addition to a single flow rate measurement, for example, from a flowmeter. A vector measurement equation may be written as $$z_k = \begin{bmatrix} Q_{inflow} \\ Q_{tubing} \\ Q_{choke} \\ Q_{flowline} \\ Q_{meter} \end{bmatrix} = \begin{bmatrix} 1 \\ 1 \\ 1 \\ 1 \\ 1 \end{bmatrix} q_k + v_k = H_k q_k + v_k \quad \text{(Equation 9)}$$

$$v_k \sim \mathcal{N}(0, \Lambda_v)$$

Here, $q_k$ is the single branch flow rate that is to be estimated from the M=5 measurements. $z_k$ is an (M×1) vector of available flow rate information, namely the four local flow meter estimates and the meter flow rate measurement. $H_k$ is an (M×1) column vector of ones.

Cases 1 and 2 can both be approached the same way. In both cases, the measurements are assumed to be imperfect, and the different elements of each measurement vector can have different qualities. Variable $v_k$ is an unknown (N×1) or (M×1) column vector of zero-mean Gaussian noise characterized by a known (N×N) or (M×M) covariance matrix $\Lambda_v$, whose entries reflect the relative level of uncertainty in each measurement. The higher quality measurements like physical flow meter data may be represented with smaller noise level than a local meter. In either case, given an actual vector of measurements $z_k = Z_k$, Equation 8 or Equation 9 lead to the same linear weighted least-squares estimator of flow rate:

$$\hat{q}_k = [H_k' \Lambda_v^{-1} H_k]^{-1} H_k' \Lambda_v^{-1} Z_k \quad \text{(Equation 10)}$$

Note, however, that the techniques of this section perform a weighted average of explicitly computed local meter rates to determine a corrected flow rate. However, weighted averages of local meters do not accurately model transient pipeline events, because there is no reason to expect that the various local meters may be consistent in the presence of transient events. Accordingly, the techniques of the next section may be employed advantageously over the techniques of this section.

V. Bayesian Estimation of Flow Rate without Explicit Determination of Local Meters The method for virtual flow metering (VFM) is illustrated here using a simple representative single branch model shown in FIG. 4. In general, VFM can be applied to a wide range of branch and network models in a similar way.

Production System

The single branch model in FIG. 4 includes several main components, each characterized by a set of parameters and variables:

Inflow: flow of reservoir fluid into the well is characterized by an Inflow Performance Relation (IPR) that includes parameters such as productivity index (PI) and reservoir pressure $P_{res}$ and temperature $T_{res}$, as well as information about the geometry and perforations at the bottom of the wellbore;

Well: the flow of fluids within the well tubing and casing is characterized by the physical description of the wellbore, including parameters such as tubing diameter $D_{tubing}$ and friction $F_{tubing}$, as well as a description of the wellbore completion materials, etc. The well and tubing can also include information about wellbore artificial lift, using such methods as gas lift or wellbore pumping. The state of the wellbore is characterized by the tubing head pressure and temperature ($P_{th}$, $T_{th}$) and the well flowing bottomhole pressure and temperature ($P_{wf}$, $T_{wf}$);

Surface: the flow of fluids in the surface network is characterized by the physical description of the well head, the choke (e.g., parameters such as choke coefficient $C_v$ and bean size $D_{choke}$), and the flow line (e.g., parameters such as diameter $D_{flowline}$ and friction $F_{flowline}$, as well as a description of the flowline materials and construction, etc. The surface system can also include equipment and components such as seabed multiphase pumps, manifolds, separators, etc. The state of the surface network is characterized by the upstream tubing head pressure and temperature ($P_{th}$, $T_{th}$), the choke outlet pressure and temperature ($P_{ch}$, $T_{ch}$) and the separator inlet pressure and temperature ($P_{sep}$, $T_{sep}$);

Fluids: reservoir fluids flowing through the single branch are characterized using either (1) a fully compositional oil-water-gas description or (2) a black oil model with physical properties including watercut $W_c$ and gas-liquid ratio $R_{gl}$. It is assumed here that the densities $\rho_o$, $\rho_w$, $\rho_g$ of the three phase fractions are known, in which case knowledge of mass flow rate ($Q_m$), watercut $W_c$ and gas-liquid ratio $R_{gl}$ is sufficient to determine $Q_o$, $Q_w$, $Q_g$, the volumetric flow rate of each phase.

Simulation Model

The nonlinear thermal-hydraulic single-branch model (steady-state or transient) is represented here as $$v = f(u; \gamma) \quad \text{(Equation 11)}$$

In this expression, the single branch variables have been divided into three groups, one example of which is shown in Equation 12:

Model inputs: a (5×1) column vector u represents boundary conditions and fluid properties that play the role of inputs to the branch simulation model;

Model outputs: an (8×1) column vector v represents key pressures and temperatures and the mass flow rate in the branch; these may be outputs from a branch simulation computation;

Model parameters: a column vector $\gamma$ is a representative set of internal parameters in the branch model. As indicated in Equation 11, these variables $\gamma$ are inputs to the simulation model, like the elements in u. Two sets of input variables are introduced because the variables in u may be estimated at each time in VFM, whereas the variables in $\gamma$ are model input parameters that are assumed to remain constant with time and are not estimated at each time step. If one or more variables in $\gamma$ are believed to change with time (e.g., decreasing inflow productivity index of increasing tubing friction), these variables can be added to the vector u, without loss of generality in the method. The assignment of variables to the three groups in Equation 12 is not unique and is intended to illustrate the VFM method.

$$u = \begin{bmatrix} P_{res} \\ T_{res} \\ P_{sep} \\ W_c \\ R_{gl} \end{bmatrix} \quad \text{(Equation 12)}$$

$$v = \begin{bmatrix} Q_m \\ P_{wf} \\ T_{wf} \\ P_{th} \\ T_{th} \\ P_{ch} \\ T_{ch} \\ T_{sep} \end{bmatrix}$$

$$\gamma = \begin{bmatrix} PI \\ D_{tubing} \\ F_{tubing} \\ C_v \\ D_{choke} \\ D_{flowline} \\ F_{flowline} \end{bmatrix}$$

For a given problem, the variables assigned to each of the three groups may depend on the specific case being addressed. In order to illustrate the VFM methodology, a representative set of variables is assigned to each group in Equation 11. More generally, a wide range of cases can be addressed in a similar fashion.

Measurements

The objective of the Virtual Flow Meter (VFM) method is to combine available online measurement data with a production system thermal-hydraulic model in order to estimate multiphase flow rate. When new measurements become available, the VFM method may use the new data to improve the multiphase virtual flow rate estimates, as well as to validate and improve the quality of the simulation model.

For most VFM implementations, new measurement data can come from a variety of sensors and instrumentation situated along the branch:

Pressure-Temperature: gauges may be installed to provide information at well head ($P_{th}$, $T_{th}$) and separator inlet ($P_{sep}$, $T_{sep}$), and may also be available at the well bottomhole location ($P_{wf}$, $T_{wf}$) and at the choke outlet ($P_{ch}$, $T_{ch}$);

Fluid: Information about the fluid composition and PVT properties comes from physical samples taken from the reservoir formation or the well-network system and evaluated in the laboratory, and watercut and gas-oil ratio information may come for suitable measurement sensors in the field;

Reservoir: During field life, information about the reservoir pressure $P_{res}$ can be obtained from pressure transient information (PTA such as build-up testing) as well as material balance evaluation;

Flow rate: Different types of field equipment may be used to measure flow rates, for example, a. Wet gas meter: determines mass flow rate ($Q_m$) of a wet gas stream by measuring pressure drop across a flow restricting orifice;

b. Multiphase flow meter: determines oil, water and gas flow rates ($Q_o$, $Q_w$, $Q_g$ or equivalently $Q_m$, $W_c$, $R_{gl}$), by measuring Venturi pressure drop (mass flow rate) and gamma ray attenuation (dependent on phase splits) of a flowing multiphase fluid;

c. Separator well test: measures the volumes rates of oil, water and gas after physical separation in a separation vessel.

Objective

VFM is a method that combines new measurement data with an available single branch model $v=f(u;\gamma)$ in order to estimate multiphase flow rate. There are several challenges faced with the VFM problem:
1) Measurements (listed above) are made in both the model input vector u (e.g., $P_{res}$, $W_c$ and $R_{gl}$) as well as the model output vector v (for example $P_{wf}$, $P_{th}$, $Q_m$ and others);
2) The variables to be estimated can come from both the model input vector u (for example, many operators want VFM to automatically determine changes in watercut $W_c$ from pressure-temperature data) as well as the model output vector v (e.g. mass flow rate $Q_m$);

The method disclosed herein combines uncertain measurements of both the inputs and outputs of the simulation model $v=f(u;\gamma)$, in order to estimate variables in both the inputs and outputs of the simulation model, notably multi-phase flow rates.

Virtual Flow Metering as an Estimation Problem

Recall the nonlinear thermal-hydraulic single-branch model (steady-state or transient) is represented as $$v = f(u;\gamma) \quad \text{(Equation 13)}$$

Also recall that two sets of input variables are introduced because the variables in u are may be estimated at each time in VFM, whereas the variables in $\gamma$ are model input parameters that are assumed to remain constant with time and are not estimated. If one or more variables in $\gamma$ are believed to change with time (e.g., changing choke coefficient as the choke erodes), these variables can be added to the vector u in the general approach of the method, as illustrated in the following example.

Estimated Variables

The model input variables u and output variables v may be grouped into a vector x shown in Equation 14 below.

other variables may be included in the vectors u and a depending on the problem being solved. For example, if VFM is being used to estimate flow rates and to history-match or calibrate the model $f(u; \gamma)$, internal model parameters in the vector $\gamma$ (e.g., tubing friction or internal diameter) can be estimated by including them in the vector of estimated variables u in Equation 14.

$$x = \begin{Bmatrix} a \\ \text{Estimated} \\ \text{variables} \\ \\ b \\ \text{Non-} \\ \text{estimated} \\ \text{variables} \end{Bmatrix} \begin{Bmatrix} \begin{bmatrix} P_{res} \\ T_{res} \\ P_{sep} \\ W_c \\ R_{gl} \\ C_v \\ Q_m \\ P_{wf} \\ T_{wf} \\ P_{th} \\ T_{th} \\ P_{ch} \\ T_{ch} \\ T_{sep} \end{bmatrix} \end{Bmatrix} \begin{matrix} u \\ \text{Independent} \\ \text{variables} \\ \text{(inputs)} \\ \\ v \\ \text{Dependent} \\ \text{variables} \\ \text{(outputs)} \end{matrix} \quad \text{(Equation 14)}$$

In the following development, the vectors x, u and a will be related to one another using matrix pre-multiplication by a zero-one matrix. For example, the vector a will be represented as $a=Jx$, which for the current example is $$a = \begin{bmatrix} P_{res} \\ T_{res} \\ P_{sep} \\ W_c \\ R_{gl} \\ C_v \\ Q_m \end{bmatrix} = \begin{bmatrix} 1 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 \end{bmatrix} x = Jx \quad \text{(Equation 15)}$$

Within the vector x, the variables may be grouped in two ways. The right-side grouping of variables into input vector u and output vector v was introduced earlier in Equation 12 and Equation 13. The left-side grouping defines a vector a of variables whose estimates (and error covariance) may be carried from one time to the next during the VFM rate estimation process. The vector a is made up of two sets: (1) the variables in the input vector u (since estimates of the model input variables may be carried from one time to the next), and (2) any other variables that are to be estimated, such as the mass flow rate $Q_m$.

Equation 14 shows one example of a possible grouping of variables, in order to illustrate the method. More generally, And the vector u will be represented as $u=Ka$, which for the current example is $$u = \begin{bmatrix} P_{res} \\ T_{res} \\ P_{sep} \\ W_c \\ R_{gl} \\ C_v \end{bmatrix} = \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \end{bmatrix} a = Ka \quad \text{(Equation 16)}$$

Measurements

At any time during the VFM rate estimation process, any of the variables in the vector x may be available as measurements, as described earlier. For example,

- the online digital oilfield monitoring system may provide online measurement of pressures and temperatures ($P_{wf}$, $T_{wf}$, $P_{th}$, $T_{th}$);
- $P_{res}$ might be available from pressure transient analysis;
- the phase fractions $W_c$ and $R_{gl}$ might be available from laboratory fluid analysis.

The measurements available for VFM may be different from one time to the next. At any time during the VFM process, the available measurements may be represented by pre-multiplying the vector x by a zero-one time-dependent matrix H for that time step so the measurements are denoted as the vector Hx.

For example, suppose the available measurements are made up of the pressures and temperatures measured bottom hole, at the tubing head, at the choke outlet, and at the separator inlet. In this case, the measurement vector and measurement matrix H at this time step are given by:

$$\begin{bmatrix} P_{wf} \\ T_{wf} \\ P_{th} \\ T_{th} \\ P_{ch} \\ T_{ch} \\ P_{sep} \\ T_{sep} \end{bmatrix} = \begin{bmatrix} 0 & 0 & 0 & 0 & 0 & 0 & 1 & 0 & 0 & 0 & 0 & 0 & 0 \\ 0 & 0 & 0 & 0 & 0 & 0 & 0 & 1 & 0 & 0 & 0 & 0 & 0 \\ 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 1 & 0 \\ 0 & 0 & 1 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 1 \end{bmatrix} \begin{bmatrix} P_{res} \\ T_{res} \\ P_{sep} \\ W_c \\ R_{gl} \\ C_v \\ Q_m \\ P_{wf} \\ T_{wf} \\ P_{th} \\ T_{th} \\ P_{ch} \\ T_{ch} \\ T_{sep} \end{bmatrix} \triangleq Hx \quad \text{(Equation 17a)}$$

As another example, if the measurements are the three-phase flow rates measured using a multi-phase flow meter (such as the Schlumberger Vx meter) or through a separator well test, or a LACT meter, the measurements of oil, water, and gas rates can be equivalently expressed as mass flow rate, water cut and gas-liquid ratio, so the measurement vector and matrix H at this time step are given by:

$$\begin{bmatrix} Q_m \\ W_c \\ R_{gl} \end{bmatrix} = \begin{bmatrix} 0 & 0 & 0 & 0 & 0 & 1 & 0 & 0 & 0 & 0 & 0 & 0 & 0 \\ 0 & 0 & 0 & 1 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 \end{bmatrix} \begin{bmatrix} P_{res} \\ T_{res} \\ P_{sep} \\ W_c \\ R_{gl} \\ C_v \\ Q_m \\ P_{wf} \\ T_{wf} \\ P_{th} \\ T_{th} \\ P_{ch} \\ T_{ch} \\ T_{sep} \end{bmatrix} \triangleq Hx \quad \text{(Equation 17b)}$$

In practice, the measurements are not noise-free as shown above, and they may have some level of uncertainty. Measurement uncertainty may be represented using an additive measurement noise term, in which case the measurement at a given time is represented as $$y = Hx + w \quad w \sim \mathcal{N}(0, \Lambda_w) \quad \text{(Equation 18)}$$

Here w is an unknown zero-mean Gaussian random vector with known noise covariance $\Lambda_w$. The actual value of the noisy measurement at a given time may be represented using capital letter notation, y=Y.

Model Perturbation

Perturbations of Equation 13 around a nominal operating point $\bar{u}$ where $\bar{v} = f(\bar{u}; \gamma)$ can be described using a truncated Taylor series expansion:

$$\bar{v} + \tilde{v} = f(\bar{u} + \tilde{u}; \gamma) \cong f(\bar{u}; \gamma) + \left(\frac{\partial f}{\partial u_1}\right)\tilde{u}_1 + \left(\frac{\partial f}{\partial u_2}\right)\tilde{u}_2 + \ldots \quad \text{(Equation 19)}$$

$$\tilde{v} \cong \left(\frac{\partial f}{\partial u_1}\right)\tilde{u}_1 + \left(\frac{\partial f}{\partial u_2}\right)\tilde{u}_2 + \ldots + \left(\frac{\partial f}{\partial u_5}\right)\tilde{u}_5$$

Or, using more compact matrix-vector notation:

$$\tilde{v} \cong \nabla_{\!f} \tilde{u} \triangleq G\tilde{u} \quad \text{(Equation 20)}$$

In Equation 20, G is a gradient matrix of partial derivatives of the multi-dimensional thermal-hydraulic model response output v with respect to each element of the input vector u in Equation 12 and Equation 14.

Expected Values

It is assumed that at the start of the VFM rate estimation process the user has available a nominal value for the model input vector $\bar{u}$. During the VFM process, an estimate of the model input vector u and its uncertainty may be carried from one time to the next. To represent uncertainty in the VFM estimation process, the vector of input variables u may be represented as a Gaussian random vector with mean $m_u$ (e.g., the process begins using the initial nominal value $\bar{u}$) and covariance matrix $P_{uu}$, that is, $u \sim \mathcal{N}(m_u, P_{uu})$. For the moment, no assumptions are made about a dynamics model to represent prior knowledge about the way u varies. There is no assumption that u is a random dynamic process that satisfies a noise-driven state-space model or Markov model. The method can be generalized to include a random dynamic process to model the expected statistical variation of input vector u over time.

The expected or mean value of the model output v is denoted $m_v$ and is computed as $$m_v = f(m_u; \gamma) \quad \text{(Equation 21)}$$

This is an approximation which is valid under a locally linear model introduced in Equation 20. Knowing $m_u$ and $m_u$ as just described, as well as the vector grouping or partitioning defined in Eq. 14, the expected value $m_a$ of the vector of estimated variables a and the expected value $m_x$ of the composite vector x are related by $$m_x \triangleq \begin{bmatrix} m_u \\ m_v \end{bmatrix} = \begin{bmatrix} m_a \\ m_b \end{bmatrix} \quad \text{(Equation 22)}$$

Covariance Matrices

Although the single branch model $v = f(u; \gamma)$ is deterministic, because the input vector u is considered to be a Gaussian random vector $u \sim \mathcal{N}(m_u, P_{uu})$, the model output vector $v = f(u; \gamma)$ may also be considered a Gaussian random vector under the linearized model in Equation 20. The expected or mean value of output vector v is $m_v$ in Equation 22, and from Equation 20 the a priori covariance matrix of the model output vector v is given by:

$$P_{vv} = E\{\tilde{v}\tilde{v}'\} = E\{G\tilde{u}\tilde{u}'G'\} = GP_{uu}G' \quad \text{(Equation 23)}$$

The covariance of the vector $$x = \begin{bmatrix} u \\ v \end{bmatrix}$$

in Equation 14 is given by $$P_{xx} = \begin{bmatrix} P_{uu} & P_{uv} \\ P_{vu} & P_{vv} \end{bmatrix} = \begin{bmatrix} P_{uu} & P_{uu}G' \\ GP_{uu} & GP_{uu}G' \end{bmatrix} \quad \text{(Equation 24)}$$

Equation 24 makes use of the fact that $$P_{vu} = E\{\tilde{v}\tilde{u}'\} = E\{G\tilde{u}\tilde{u}'\} = GP_{uu} = P'_{uv} \quad \text{(Equation 25)}$$

The a priori covariance of the vector of estimated variables a in Equation 25 is given by $$P_{aa} = E\{\tilde{a}\tilde{a}'\} = E\{J\tilde{x}\tilde{x}'J'\} = JP_{xx}J' \quad \text{(Equation 26)}$$

The cross-covariance between the estimated vector $\alpha$ in Equation 25 and the measurement vector $\gamma$ in Equation 18 is given by $$P_{ay} = E\{\tilde{a}\tilde{y}'\} = E\{J\tilde{x}(H\tilde{x}+w)'\} = E\{J\tilde{x}\tilde{x}'H'\} + E\{J\tilde{x}\tilde{w}'\} = JP_{xx}H' \quad \text{(Equation 27)}$$

Finally, the covariance of the measurement vector $\gamma$ in Equation 18 is given by $$P_{yy} = E\{\tilde{y}\tilde{y}'\} = E\{(H\tilde{x}+w)(H\tilde{x}+w)'\} = \quad \text{(Equation 28)}$$
$$E\{H\tilde{x}\tilde{x}'H'\} + 2E\{H\tilde{x}w'\} + E\{ww'\} = HP_{xx}H' + \Lambda_w$$

Both Equation 27 and Equation 28 make use of the fact that the measurement noise w is uncorrelated with the model state x, that is, the cross-covariance $E\{\tilde{x}\tilde{w}'\} = 0$.

VFM Rate Estimation

Making use of known relationships of Equations (33)-(41) (see below), at a given time in the VFM rate estimation process, provided the noisy measurement y=Y, the Bayesian minimum mean-square error (MMSE) estimate of a (model input variables u plus other estimated variables like mass flow rate $Q_m$) can be expressed as:

$$\hat{a} = E\{a \mid y = Y\} = m_a + P_{ay}P_{yy}^{-1}(Y - m_y) = \quad \text{(Equation 29)}$$
$$m_a + JP_{xx}H'[HP_{xx}H' + \Lambda_w]^{-1}(Y - Hm_x)$$

From Equation 16, the corresponding a posteriori estimate of the vector u is given by $$\hat{u} = E\{u|y=Y\} = K\hat{a} \quad \text{(Equation 30)}$$

The covariance of the estimated vector α given the measurement y=Y is:

$$P_{\alpha|Y} = \quad \text{(Equation 31)}$$
$$P_{\alpha\alpha} - P_{\alpha y}P_{yy}^{-1}P_{y\alpha} = P_{\alpha\alpha} - JP_{xx}H'[HP_{xx}H' + \Lambda_w]^{-1}HP_{xx}J'$$

From Equation 16, the corresponding a posteriori covariance of the vector u is given by $$P_{u|Y} = KP_{\alpha|Y}K' \quad \text{(Equation 32)}$$

Figure 23:
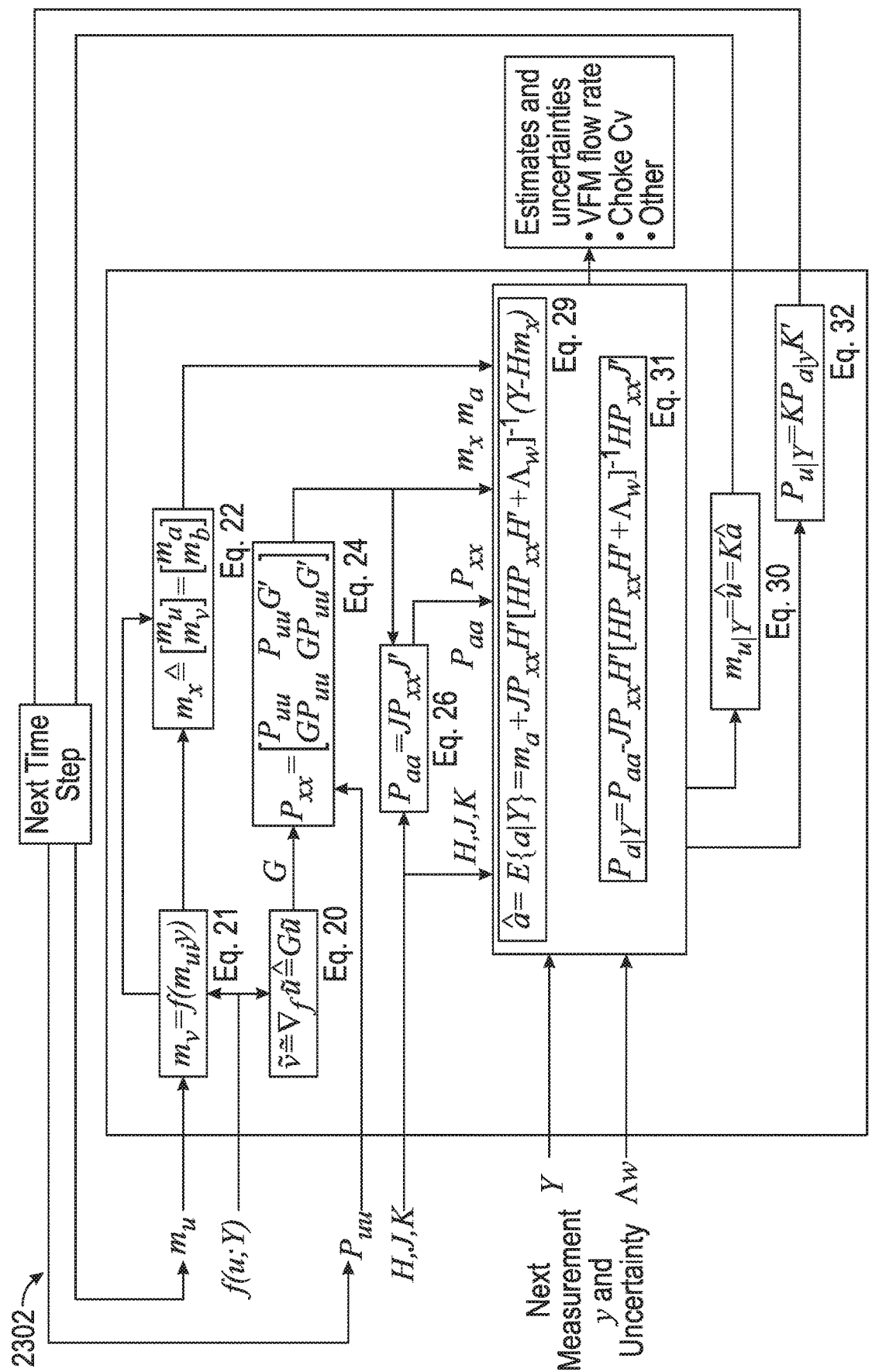
FIG. 23 shows a flow diagram of the Bayesian estimation calculations for virtual flow metering (VFM), according to some embodiments.

Error ! Reference source not found. FIG. 23 shows a flow diagram 2302 of the Bayesian estimation calculations for virtual flow metering, according to some embodiments. Such estimation calculations may be implemented using hardware as shown and described below in reference to FIG. 30, for example. Note that the only inputs to the estimator from the prior time step are $m_u$ and $p_{uu}$.

The expressions for a posteriori mean in Equation (29) and a posteriori covariance Equation 31 make use of well-established results as follows. Consider x and y which are n- and m-dimensional Gaussian random vectors:

$$z \sim \mathcal{N}_{(m_x, P_x)}, x \in \mathbb{R}^n \quad \text{(Equation 33)}$$

$$y \sim \mathcal{N}_{(m_y, P_y)}, y \in \mathbb{R}^m \quad \text{(Equation 34)}$$

Let $P_{xy}$ and $P_{yx}$ denote the cross-covariance matrices between x and y, i.e.

$$P_{xy} = E\{(x-m_x)(y-m_y)'\} \quad \text{(Equation 35)}$$

$$P_{yx} = E\{(y-m_y)(x-m_x)'\} \quad \text{(Equation 36)}$$

We are interested in the joint density between x and y denoted p(x, y). Vectors x and y are jointly Gaussian if:

$$p(x, y) \sim \mathcal{N}(m_z, P_z) \quad \text{(Equation 37)}$$

$$\text{where } z = \begin{bmatrix} x \\ y \end{bmatrix} m_z = \begin{bmatrix} m_x \\ m_y \end{bmatrix} P_z = \begin{bmatrix} P_x & P_{xy} \\ P_{yx} & P_y \end{bmatrix} \quad \text{(Equation 38)}$$

The Conditional Density Function

Suppose a measurement Y is available for the random vector γ. Because the two vectors are jointly Gaussian random vectors, the conditional probability density for x, given y=Y, is given by:

$$p(x|y) = \frac{p(x, y)}{p(y)} \sim \mathcal{N}(m, \Lambda) \quad \text{(Equation 39)}$$

$$m = E(x|y = Y) = m_x + P_{xy}P_y^{-1}(Y - m_y) \quad \text{(Equation 40)}$$

$$\Lambda = P_x - P_{xy}P_y^{-1}P_{yx} \quad \text{(Equation 41)}$$

VI. Two-Stage VFM without Explicit Local Meter Determination

Figure 24:
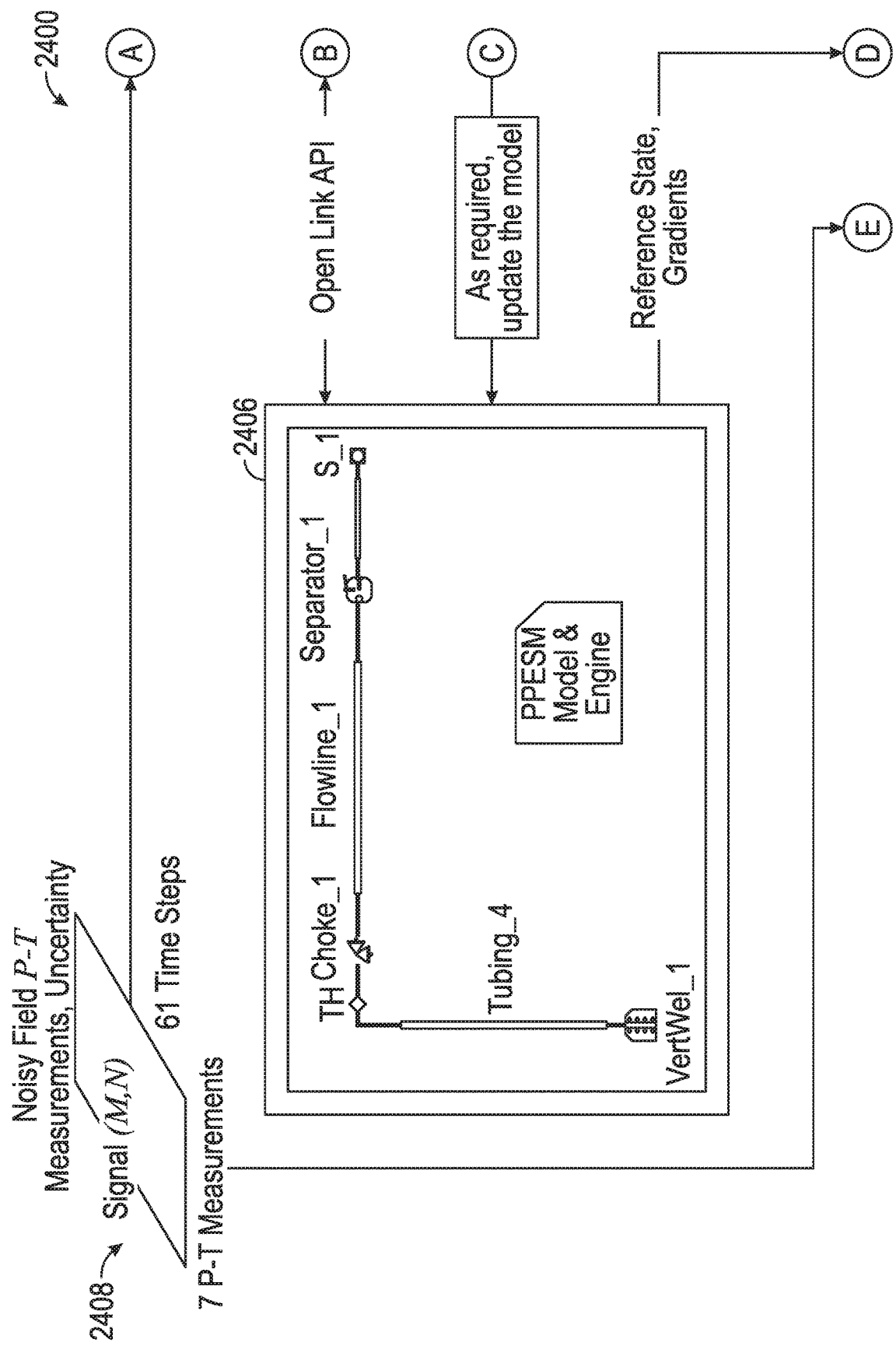
FIGS. 24-26 are a schematic diagram of a system for two-stage VFM without explicit local meter determination according to some embodiments.
Figure 25:
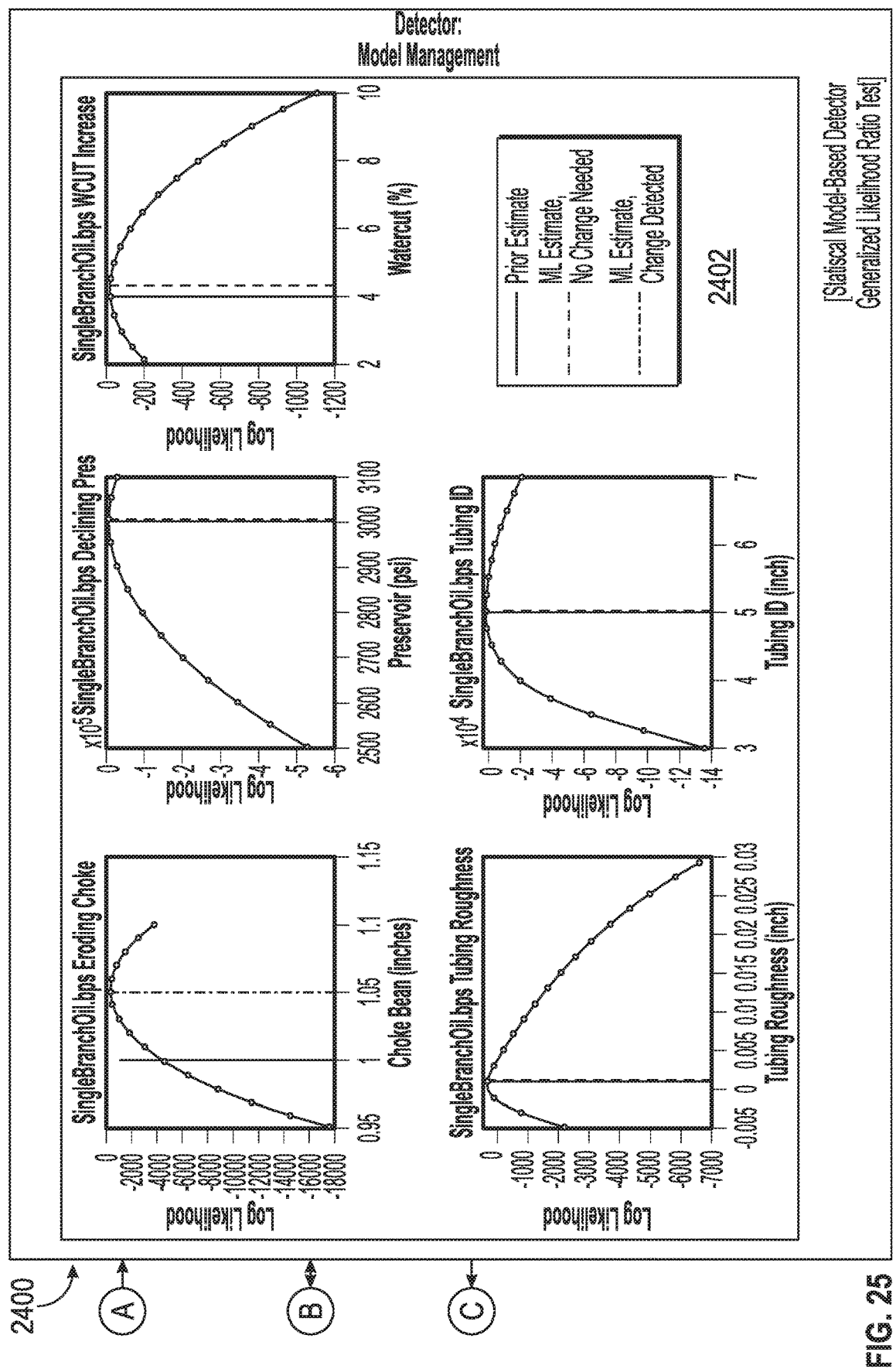
Figure 26:
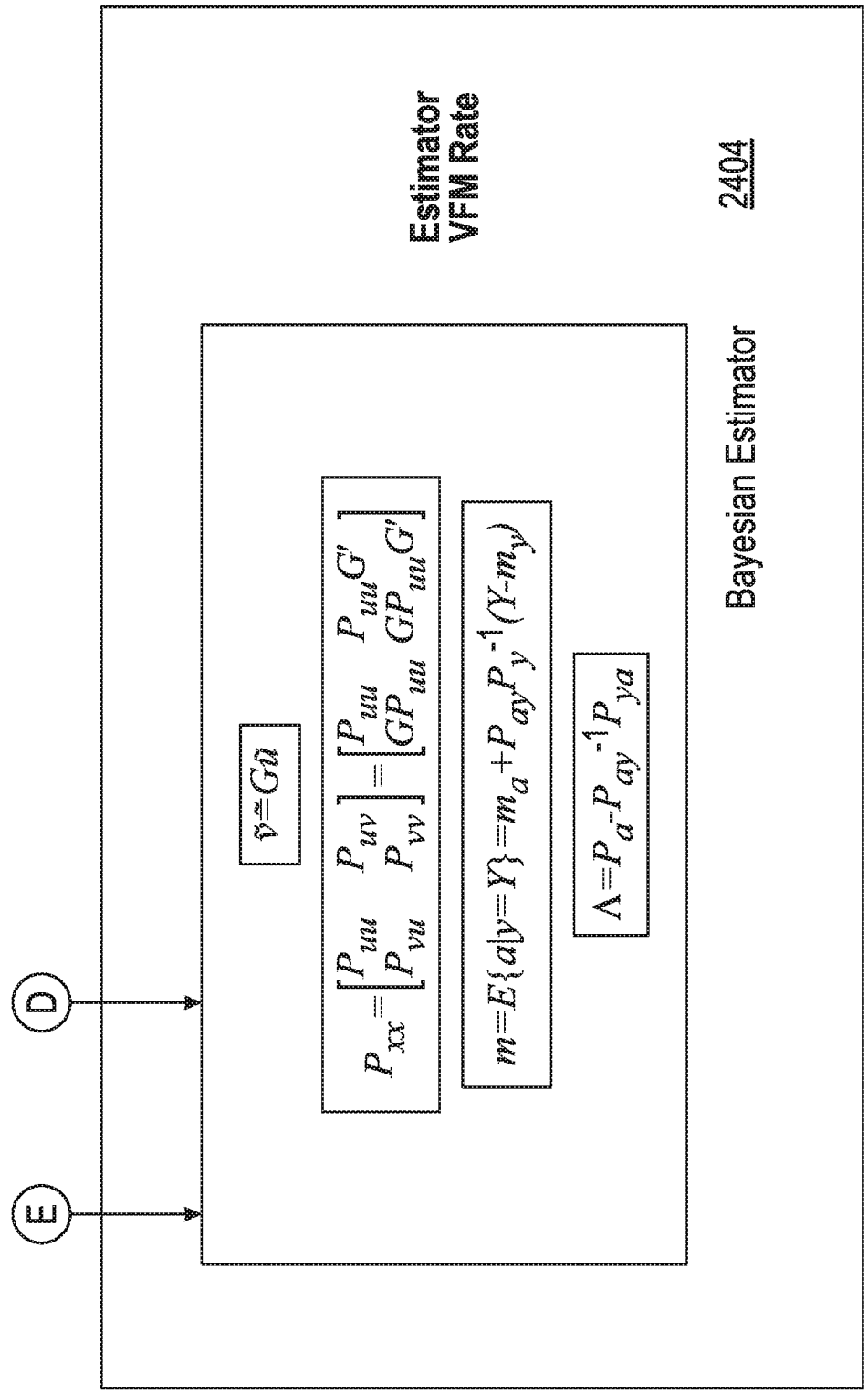

FIGS. 24-26 are a schematic diagram of a system 2400 for two-stage VFM without explicit local meter determination, according to some embodiments. System 2400 determines a flow rate for pipeline 2408. Pipeline 2408 may be as disclosed throughout, e.g., as shown and described in reference to FIGS. 1, 2, 4, and 6. System 2400 may be implemented using hardware as shown and described below in reference to FIG. 30, for example.

System 2400 includes Bayesian statistical event detector 2402. Bayesian statistical event detector 2402 may be implemented as disclosed above in Sections II, III, and V, e.g., as shown and described in reference to FIGS. 14-21. Note, however, that embodiments are not limited to Bayesian statistical event detectors; other discrepancy event detectors are possible. Bayesian statistical event detector 2402 may utilize the known Generalized Likelihood Ratio Test ("GLRT"), which computes the likelihood function for each parameter, shown as the curves in Bayesian statistical event detector 2402. The maximum likelihood estimate of each parameter (the x-axis parameter value corresponding to the peak of the function) is statistically tested (using a Likelihood Ratio Test LRT) against the prior estimate (dashed line). If it is statistically different (as is the case with the choke bean value in the upper left graph) then it is marked as "change detected", otherwise if the LRT indicates the maximum likelihood estimate is statistically close to the prior, its status is marked "no detection".

System 2400 includes Bayesian estimator 2404. Bayesian estimator 2404 may be implemented as disclosed above in Sections II, IV, and V, e.g., as shown and described in reference to FIGS. 14, 15, 22, and 23. Note, however, that embodiments are not limited to Bayesian estimators; other estimators are possible.

System 2400 further includes pipeline simulation model 2406. Pipeline simulation model 2406 may model steady state or transient pipeline behavior. Note that embodiments may utilize any type of pipeline model for pipeline simulation model 2406, including, but not limited to, pipeline simulation models, physics-based pipeline models, and predictive analytics models. For example, according to some embodiments, the pipeline model may be data driven, e.g., a neural network or other machine learning model. For purposes of illustration rather than limitation, pipeline simulation model 2406 is described herein as a physics-based pipeline simulation model as disclosed herein, e.g., PIPESIM (e.g., for steady state simulation), OLGA (e.g., for transient dynamic behavior), v=f(u; γ), etc.

The components of system 2400 are communicatively coupled in various ways. Sensors present in or on pipeline 2408 to measure various quantities such as temperature, pressure, flow rate, etc. are communicatively coupled to at least both Bayesian statistical event detector 2402 and Bayesian estimator 2404. Such coupling may be affected by direct electrical coupling, of via networked nodes, for example. Pipeline simulation model 2406 is communicatively coupled to Bayesian statistical event detector 2402 via an open link Application Program Interface ("API"). This API permits Bayesian statistical event detector 2402 to update pipeline simulation model 2406 to detect and account for discrepancy events as disclosed herein, e.g., in Sections II and III. Pipeline simulation model 2406 is communicatively coupled to Bayesian estimator 2404, e.g., via a network link. This link permits Bayesian estimator 2404 to receive information from pipeline simulation model 2406 in order to compute a corrected branch flow rate as disclosed herein, e.g., in Sections II and V.

Figure 27:
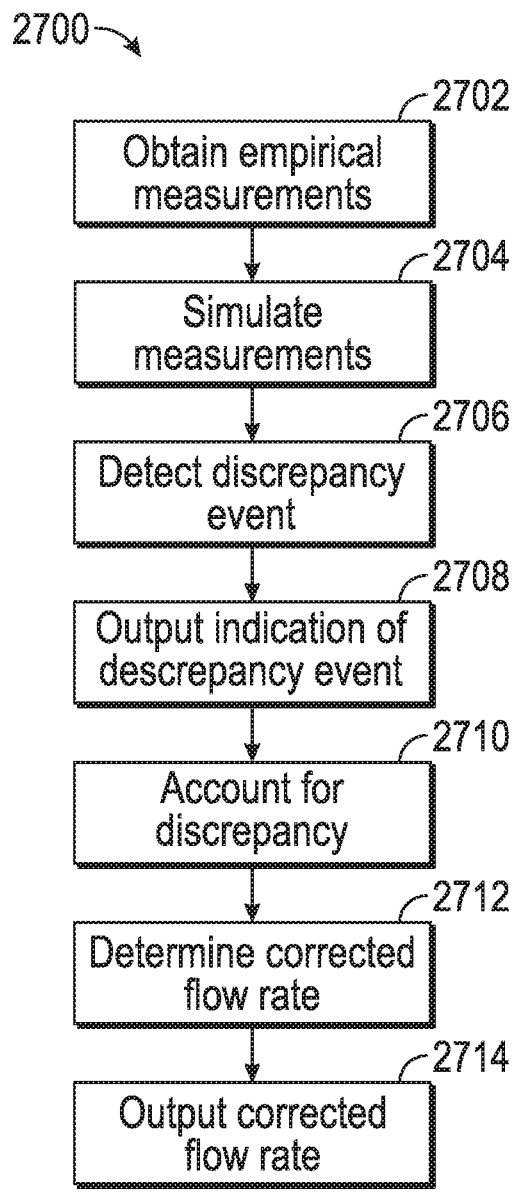

FIG. 27 is a flow diagram of a method 2700 for two-stage VFM without explicit local meter determination according to some embodiments. Method 2700 may be implemented using hardware as shown and described below in reference to FIG. 30, for example, configured as shown and described herein, e.g., in reference to FIGS. 14, 15, and 24. Method 2700 may be used to estimate a corrected flow rate in a pipeline, such as shown and described herein in reference to FIGS. 1, 2, 4, and 6, despite the presence of a discrepancy event.

At block 2702, method 2700 obtains empirical measurements of pipeline conditions. Such measurements may be obtained by a plurality of sensors positioned in or on the pipeline under consideration, at a plurality of locations, as disclosed herein. Such measurements may be of temperature, pressure, flow rate, etc.

At block 2704, method 2700 simulates a plurality of pipeline measurements using a pipeline simulation model, such as pipeline simulation model 2406 as shown and described above in reference to FIGS. 24, 25, and 26. The measurements may include a plurality of simulated temperature and pressure measurements for the same locations from which the measurements of block 2702 were obtained in or on the pipeline.

At block 2706, method 2700 detects a discrepancy event for the pipeline. The discrepancy event may represent a discrepancy between the empirical temperature and pressure measurements of block 2702 and the simulated temperature and pressure measurements of block 2704. The discrepancy event may be detected by a Bayesian statistical event detector as disclosed in detail herein, such as Bayesian statistical event detector 2402 of FIGS. 24, 25, and 26.

At block 2708, method 2700 outputs to a user an indication that it detected the discrepancy event. The indication may be output via a control console on a computer monitor, such as shown and described below in reference to FIGS. 28 and 29.

At block 2710, method 2700 accounts for the detected discrepancy between the empirical and the simulated pipeline parameters. The accounting may occur in the production system and fluid models (e.g., by resetting the modelled value of reservoir pressure, choke bean, watercut, tubing diameter, or flowline diameter) or by adjusting the data itself (e.g., removing a detected measurement bias).

At block 2712, method 2700 determines a corrected branch flow rate for the pipeline under consideration. The corrected rate may be determined as disclosed in Section V above, e.g., as shown and described in reference to FIGS. 23 and 24.

At block 2714, method 2700 outputs the corrected branch flow rate determined per block 2712. The output may be accomplished by any of a variety of ways. According to some embodiments, the output comprises displaying the corrected branch flow rate to a user, e.g., via a computer monitor. According to some embodiments, the corrected branch flow rate is provided to a separate electronic process, such as a pipeline control process. According to some embodiments, the corrected branch flow rate is output to electronic persistent memory. Other manners of outputting the corrected branch flow rate are possible. Additional details and options for outputting the corrected branch flow rate are presented below in Section VII in reference to FIGS. 28 and 29.

VII. Reporting Discrepancy Event Detections

Figure 29:
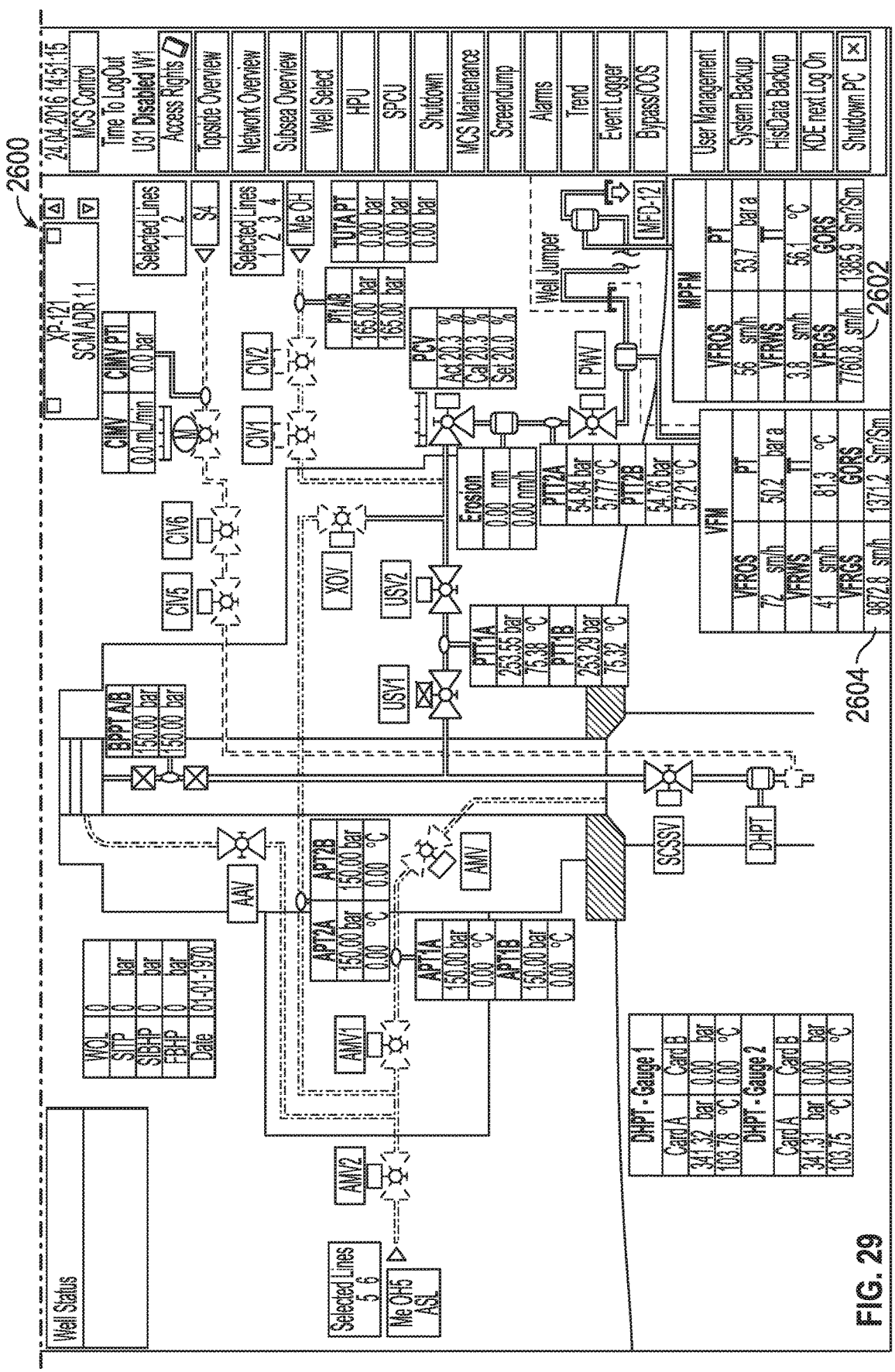

FIGS. 28 and 29 are a screenshot of a control console 2600 according to some embodiments. Control console 2600 may be implemented using hardware as shown and described below in reference to FIG. 30. Control console 2600 displays a topological representation of the pipeline under consideration. Control console also displays various pipeline components or entities, along with empirically measured and/or simulated values for physical parameters such as temperature, pressure, and flow rate at such pipeline components or entities. Control console 2600 includes a MultiPhase Flow Meter ("MPFM") field 2602 displaying empirically measured multiphase flow rates of oil, gas, and water, as well as a VFM field 2604 displaying corrected values for these quantities as determined by embodiments of the invention. Control console 2600 also includes an alert field displaying an alert 2606 indicating that a discrepancy event has been detected. Because a discrepancy event has been detected, VFM field 2604 is greyed out until such time that a user directs the system to account for the discrepancy in a manner disclosed herein, at which time VFM field 2604 displays corrected flow rates for oil, gas, and water. Note that some embodiments automatically institute the accounting for the discrepancy, without requiring additional user actions.

VIII. Conclusion

Figure 30:
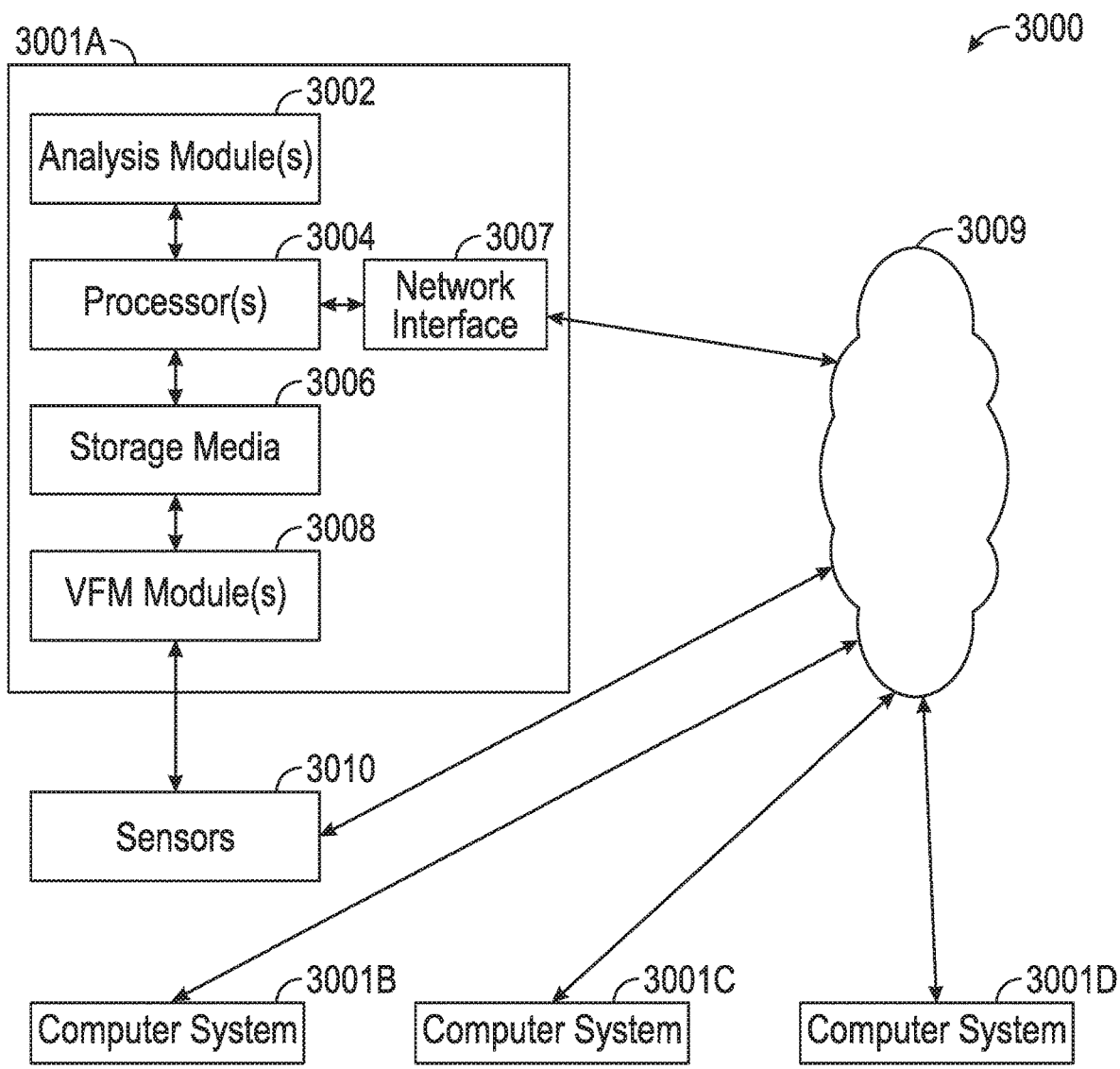
FIG. 30 is a flow diagram of a method for two-stage VFM without explicit local meter determination according to some embodiments.

FIG. 30 illustrates a schematic view of a computing system 3000, according to some embodiments. The computing system 3000 may include a computer or computer system 3001A, which may be an individual computer system 3001A or an arrangement of distributed computer systems. The computer system 3001A includes one or more analysis module(s) 3002 configured to perform various tasks according to some embodiments, such as one or more methods disclosed herein. To perform these various tasks, the analysis module 3002 executes independently, or in coordination with, one or more processors 3004, which is (or are) connected to one or more storage media 3006. The processor(s) 3004 is (or are) also connected to a network interface 3007 to allow the computer system 3001A to communicate over a data network 3009 with one or more additional computer systems and/or computing systems, such as 3001B, 3001C, and/or 3001D (note that computer systems 3001B, 3001C and/or 3001D may or may not share the same architecture as computer system 3001A, and may be located in different physical locations, e.g., computer systems 3001A and 3001B may be located in a processing facility, while in communication with one or more computer systems such as 3001C and/or 3001D that are located in one or more data centers, and/or located in varying countries on different continents).

A processor can include a microprocessor, microcontroller, processor module or subsystem, programmable integrated circuit, programmable gate array, or another control or computing device.

The storage media 3006 can be implemented as one or more computer-readable or machine-readable storage media. Note that while in the example embodiment of FIG. 30 storage media 3006 is depicted as within computer system 3001A, in some embodiments, storage media 3006 may be distributed within and/or across multiple internal and/or external enclosures of computing system 3001A and/or additional computing systems. Storage media 3006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 3000 contains one or more VFM module(s) 3008. In the example of computing system 3000, computer system 3001A includes VFM modules 3008. In some embodiments, a single flow metering module may be used to perform at least some aspects of one or more embodiments of the methods, e.g., method 2700. Further, flow metering module 3008 may implement Bayesian statistical event detector 2402 and Bayesian estimator 2404 of FIGS. 24, 25, and 26. In other embodiments, a plurality of flow metering modules may be used to perform at least some aspects of the methods.

Computing system 3000 is communicatively coupled to a plurality of pipeline sensors 3010 as disclosed herein, either via direct electrical connection, via a computer network, or both.

It should be appreciated that computing system 3000 is one example of a computing system, and that computing system 3000 may have more or fewer components than shown, may combine additional components not depicted in the example embodiment of FIG. 30, and/or computing system 3000 may have a different configuration or arrangement of the components depicted in FIG. 30. The various components shown in FIG. 30 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

The system and method described above include a two-stage process for VFM including an initial stage of detection followed by statistical estimation of flow rate. The initial stage of detection identifies whether or not an event has occurred that causes a discrepancy or mismatch between actual measurements and the prediction of those measurements made using an available simulation model. The first stage of detection is carried out using a filter bank including a bank of parallel (e.g., simultaneous) likelihood computations. The filter bank was illustrated for a few specific events. However, the filter bank method is very general and can be used to handle a variety of potential events, for example, the event that upper gas-lift valves are open in a gas-lifted well, or a tubing leak is present. The filter bank could also compute in parallel the probabilities over a set of possible thermal-hydraulic correlation functions, in order to identify a correlation function (or small set of correlation functions) that are most compatible with the observed data. The filter bank method is general and easily scales up to handle dozens of possible discrepancy events in an automated approach. This facilitates an adaptive or evolutionary methodology that would be more resilient to changes in the underlying system than current systems. The second stage uses information provided by the first stage and the simulation model to determine a corrected flow rate, which can include a multiphase flow rate. The second stage need not explicitly determine any local meters in order to determine a corrected flow rate.

The method is illustrated here using a simple example of a single branch model having a fixed measurement configuration. However, the two-stage VFM method disclosed is very general and can easily handle complicated pipeline topologies and measurement configurations that are time-dependent. For example, separator well tests in any well may be available at certain times, or knowledge about reservoir pressure from pressure transient analysis may be available from time to time.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method of detecting and correcting for discrepancy events in a fluid pipeline, the method comprising:
   obtaining a plurality of empirical temperature and pressure measurements at a plurality of locations within the pipeline;
   simulating, using a pipeline model, a plurality of simulated temperature and pressure measurements for the plurality of locations within the pipeline;
   detecting, by a discrepancy event detector, at least one discrepancy event representing a discrepancy between the empirical temperature and pressure measurements and the simulated temperature and pressure measurements;
   outputting to a user an indication that the at least one discrepancy event has been detected;
   accounting for the discrepancy, wherein the accounting for the discrepancy comprises accounting for the at least one discrepancy by modifying at least one value of the empirical pressure and temperature measurements;
   determining, after the accounting and using an estimator applied to the pipeline model, a corrected branch flow rate for the pipeline; and
   outputting the corrected branch flow rate for the pipeline to the user.

2. The method of claim 1, wherein the pipeline model comprises a pipeline simulation model that models transient events in the pipeline.

3. The method of claim 1, wherein the discrepancy event comprises at least one of: a change in fluid phase fraction, erosion of a choke in the pipeline, deposition of solids in the pipeline, or the presence of measurement bias in a sensor for the pipeline.

4. The method of claim 1, wherein the discrepancy event detector comprises a filter bank.

5. The method of claim 4, wherein the filter bank performs a plurality of simultaneous likelihood computations.

6. The method of claim 1, wherein the corrected branch flow rate comprises a flow rate for at least one of: petroleum, water, and gas.

7. The method of claim 1, wherein the corrected branch flow rate comprises a multiphase fluid flow rate.

8. A method of detecting and correcting for discrepancy events in a fluid pipeline, the method comprising:
   obtaining a plurality of empirical temperature and pressure measurements at a plurality of locations within the pipeline;
   simulating, using a pipeline model, a plurality of simulated temperature and pressure measurements for the plurality of locations within the pipeline;
   detecting, by a discrepancy event detector, at least one discrepancy event representing a discrepancy between the empirical temperature and pressure measurements and the simulated temperature and pressure measurements;
   outputting to a user an indication that the at least one discrepancy event has been detected;
   accounting for the discrepancy;
   determining, after the accounting and using an estimator applied to the pipeline model, a corrected branch flow rate for the pipeline; and
   outputting the corrected branch flow rate for the pipeline to the user, wherein the estimator comprises a linear Bayesian minimum mean square error estimator.

9. The method of claim 8, wherein the linear Bayesian minimum mean square error estimator combines uncertainties of inputs to, and outputs of, the pipeline model to estimate values of inputs to, and outputs of, the pipeline model.

10. The method of claim 8, wherein the accounting for the discrepancy comprises accounting for the at least one discrepancy by modifying at least one value of the empirical pressure and temperature measurements.

11. A system for detecting and correcting for discrepancy events in a fluid pipeline, the system comprising at least one electronic processor that executes persistently stored instructions to perform operations comprising:
   obtaining a plurality of empirical temperature and pressure measurements at a plurality of locations within the pipeline;
   simulating, using a pipeline model, a plurality of simulated temperature and pressure measurements for the plurality of locations within the pipeline;
   detecting, by a discrepancy event detector, at least one discrepancy event representing a discrepancy between the empirical temperature and pressure measurements and the simulated temperature and pressure measurements;
   outputting to a user an indication that the at least one discrepancy event has been detected;
   accounting for the discrepancy, wherein the accounting for the discrepancy comprises accounting for the at least one discrepancy by modifying at least one value of the empirical pressure and temperature measurements;
   determining, after the accounting and using an estimator applied to the pipeline model, a corrected branch flow rate for the pipeline; and
   outputting the corrected branch flow rate for the pipeline to the user.

12. The system of claim 11, wherein the pipeline model comprises a pipeline simulation model that models transient events in the pipeline.

13. The system of claim 11, wherein the discrepancy event comprises at least one of: a change in fluid phase fraction, erosion of a choke in the pipeline, deposition of solids in the pipeline, or the presence of measurement bias in a sensor for the pipeline.

14. The system of claim 11, wherein the discrepancy event detector comprises a filter bank.

15. The system of claim 14, wherein the filter bank performs a plurality of simultaneous likelihood computations.

16. The system of claim 11, wherein the estimator comprises a linear Bayesian minimum mean square error estimator.

17. The system of claim 16, wherein the linear Bayesian minimum mean square error estimator combines uncertainties of inputs to, and outputs of, the pipeline model to estimate values of inputs to, and outputs of, the pipeline model.

18. The system of claim 11, wherein the corrected branch flow rate comprises a flow rate for at least one of: petroleum, water, and gas.

19. The system of claim 11, wherein the corrected branch flow rate comprises a multiphase fluid flow rate.

* * * * *